US009077980B2

(12) United States Patent
Takagi et al.

(10) Patent No.: US 9,077,980 B2
(45) Date of Patent: Jul. 7, 2015

(54) COMPOUND EYE IMAGING APPARATUS AND METHOD WITH LEFT IMAGE AND RIGHT IMAGE PROCESSOR TO CALCULATE CORRECTION VALUE FOR LENS POSITION

(75) Inventors: Hideo Takagi, Saitama (JP); Kenji Goto, Chiba (JP); Masafumi Takiguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 658 days.

(21) Appl. No.: 13/304,927

(22) Filed: Nov. 28, 2011

(65) Prior Publication Data
US 2012/0154550 A1 Jun. 21, 2012

(30) Foreign Application Priority Data

Dec. 20, 2010 (JP) ................................. 2010-282852

(51) Int. Cl.
*H04N 13/02* (2006.01)
*G06K 9/00* (2006.01)
*H04N 5/232* (2006.01)
*G06T 5/00* (2006.01)

(52) U.S. Cl.
CPC .............. *H04N 13/0239* (2013.01); *G06K 9/00* (2013.01); *H04N 5/23258* (2013.01); *H04N 13/0296* (2013.01); *G06T 5/003* (2013.01); *G06T 2207/20201* (2013.01)

(58) Field of Classification Search
CPC ................................. H04N 13/02; G06K 9/00
USPC .......................................................... 348/49
See application file for complete search history.

(56) References Cited

U.S. PATENT DOCUMENTS

| 5,786,847 | A * | 7/1998 | Katayama et al. ............... 348/47 |
| 8,502,863 | B2 * | 8/2013 | Hoshino .......................... 348/46 |
| 8,619,082 | B1 * | 12/2013 | Ciurea et al. .................. 345/427 |
| 2006/0257129 | A1 * | 11/2006 | Shibatani ........................ 396/55 |

(Continued)

FOREIGN PATENT DOCUMENTS

| JP | 2010-109904 | * | 5/2010 |
| JP | WO2010-104089 | * | 9/2010 |

(Continued)

OTHER PUBLICATIONS

Office Action issued Nov. 3, 2014 in Chinese Patent Application No. 201110414930.8 (with English translation).

*Primary Examiner* — Richard Torrente
*Assistant Examiner* — Irfan Habib
(74) *Attorney, Agent, or Firm* — Oblon, McClelland, Maier & Neustadt, L.L.P.

(57) ABSTRACT

A correction value calculation apparatus that includes circuitry configured to: acquire a relative position of a feature point to a reference point in a left/right image formed by a left/right lens as a left/right pixel position in the case where the left/right lens is moved in a coordinate system constructed with a pitch axis and a yaw axis; detect a relative position of the left/right lens to a reference position as a left/right lens detection position; generate a characteristic representing a relationship between the left/right pixel position and the left/right lens detection position; set each of the left/right lens detection position as a correction object position and determine an adjustment position which is a position on a straight line connecting the left and right pixel positions; and calculate correction values which are differences between the left and right lens detection positions.

13 Claims, 20 Drawing Sheets

(56) References Cited

U.S. PATENT DOCUMENTS

| | | | |
|---|---|---|---|
| 2008/0112616 A1* | 5/2008 | Koo et al. | 382/171 |
| 2009/0034950 A1* | 2/2009 | Takagi et al. | 396/55 |
| 2010/0150455 A1* | 6/2010 | Oyama | 382/219 |
| 2011/0012997 A1* | 1/2011 | Koguchi | 348/47 |
| 2011/0018970 A1* | 1/2011 | Wakabayashi | 348/47 |
| 2011/0018971 A1* | 1/2011 | Hasegawa | 348/47 |
| 2011/0019989 A1* | 1/2011 | Tanaka | 396/104 |
| 2011/0050856 A1* | 3/2011 | Nakazawa et al. | 348/47 |
| 2011/0122232 A1* | 5/2011 | Hoshino | 348/47 |
| 2011/0234853 A1* | 9/2011 | Hayashi et al. | 348/231.99 |
| 2011/0292227 A1* | 12/2011 | Nakazawa | 348/218.1 |
| 2012/0094754 A1* | 4/2012 | Suzuki et al. | 463/30 |
| 2013/0128009 A1* | 5/2013 | Nakazawa | 348/49 |
| 2013/0342715 A1* | 12/2013 | Nakayama et al. | 348/208.11 |

FOREIGN PATENT DOCUMENTS

| | | | |
|---|---|---|---|
| WO | WO2010-104089 | * | 9/2010 |
| WO | WO 2010/104089 A1 | | 9/2010 |

* cited by examiner

| CORRECTION OBJECT POSITION $P_S$ | | CORRECTION VALUE $C_L$ | | CORRECTION VALUE $C_R$ | |
|---|---|---|---|---|---|
| $X_P[0]$ | $Y_P[0]$ | $X_{CL}[0]$ | $Y_{CL}[0]$ | $X_{CR}[0]$ | $Y_{CR}[0]$ |
| $X_P[1]$ | $Y_P[1]$ | $X_{CL}[1]$ | $Y_{CL}[1]$ | $X_{CR}[1]$ | $Y_{CR}[1]$ |
| ⋮ | ⋮ | ⋮ | ⋮ | ⋮ | ⋮ |
| $X_P[8]$ | $Y_P[8]$ | $X_{CL}[8]$ | $Y_{CL}[8]$ | $X_{CR}[8]$ | $Y_{CR}[8]$ |

COMPOUND EYE IMAGING APPARATUS AND METHOD WITH LEFT IMAGE AND RIGHT IMAGE PROCESSOR TO CALCULATE CORRECTION VALUE FOR LENS POSITION

BACKGROUND

The present disclosure relates to a correction value calculation apparatus, a compound eye imaging apparatus, and a method of controlling a correction value calculation apparatus, and more particularly to, a correction value calculation apparatus, a compound eye imaging apparatus, and a method of controlling a correction value calculation apparatus capable of performing calculation relating to hand blur correction.

In the related art, a technique of performing hand blur correction on an imaging apparatus is classified into an optical type, an electronic type, and the like. In the optical hand blur correction, the imaging apparatus detects hand blur by using a gyro sensor and physically moves a lens in a direction for removing the hand blur. In the electronic hand blur correction, a size of an image-capturable area is set to be smaller than the entire size of the image; the first image captured by the imaging apparatus and the second and latter images are compared; and the image-capturable areas of the second and latter images are shifted, so that the hand blur correction is performed.

Recently, although a compound eye imaging apparatus capturing images for viewing a stereoscopic image has been developed, in the case where the optical hand blur correction is performed in the compound eye imaging apparatus, the right eye lens and the left eye lens may be necessarily moved by the same distance in the compound eye imaging apparatus. If the movement amounts of the lenses are not appropriate, deviation may occur between the movement amount of the left image for the left eye and the movement amount of the right image for the right eye according to the movement of the lenses, so that stereoscopic viewing may be difficult. In addition, a feeling of discomfort may be inflicted upon the user. In addition, a compound eye imaging apparatus where anti-vibration performance of the lenses is uniformized so that the shift between the images does not occur is disclosed (for example, refer to Japanese Unexamined Patent Application Publication No. 2010-109904).

The compound eye imaging apparatus includes lenses L and R, two position sensors which detect positions of the lenses, two motors which move the lenses, and two correction circuits which correct target values applied to the motors. Each of the motors moves each of the lenses so that the target values and the positions detected by the position sensors are coincident with each other. Each of the correction circuits corrects each of the target values so that the L-side control remaining difference and the R-side control remaining difference are coincident with each other. The L-side control remaining difference is a difference between the position of the lens L detected by the one Hall sensor and the target value, and the R-side control remaining difference is a difference between the position of the lens R detected by the other Hall sensor and the target value. In the compound eye imaging apparatus, the differences between the detection position of the Hall sensor and the target value in the right side and the left side are equalized, so that the anti-vibration performance of the lenses may be uniformized. Accordingly, the occurrence of the shift in the image is prevented.

SUMMARY

However, even in the aforementioned compound eye imaging apparatus, deviation occurs between the movement amount of the left image and the movement amount of the right image according to the movement of the lenses. The aforementioned correction circuit performs the correction under the assumption that there is no error in the detection value of each of the position sensors with respect to the actual position of the lens. However, the detection value of the position sensor may not be accurate. For example, in the case where the installation position of the position sensor is deviated, the detected position is deviated in proportion to the deviation of the installation position. Even in the case where the installation position is accurate, an error may occur in the detection value due to the limitation of the position sensor in the performance thereof.

Even in the case where errors occur in the detection values of the two position sensors, if the errors have the same value, the lenses are moved based on the same error by motors, so that deviation may not occur in the movement amounts of the images. However, actually, there is variation in the performance or the installation position of the position sensor. In many cases, the errors of the position sensors have different values. Therefore, in the aforementioned compound eye imaging apparatus, in the case where the errors of the position sensors are different, deviation occurs between the movement amount of the left image and the movement amount of the right image, so that there is a problem in that stereoscopic viewing becomes difficult.

It is desirable to provide a technique capable of capturing images which may be easily used for stereoscopic viewing even in the case where errors of detection values of two position sensors are different.

According to a first embodiment of the present disclosure, there are provided a correction value calculation apparatus and a method of controlling the correction value calculation apparatus. The correction value calculation apparatus includes: a left image processing unit which acquires a relative position of a feature point to a reference point in a left image formed by a left lens as a left pixel position with respect to indication values in the case where the left lens is moved according to a plurality of the indication values indicating a plurality of positions; a right image processing unit which acquires a relative position of the feature point to the reference point in a right image formed by a right lens as a right pixel position with respect to the indication values in the case where the right lens is moved according to the plurality of the indication values; a left lens position detection unit which detects the relative position of the left lens to the reference position as a left lens detection position in the case where the left lens is moved according to the plurality of the indication values; a right lens position detection unit which detects the relative position of the right lens to the reference position as a right lens detection position in the case where the right lens is moved according to the plurality of the indication values; a characteristic generation unit which generates a characteristic representing a relationship between the left pixel position and the left lens detection position based on the left pixel position and the left lens detection position and generates a characteristic representing a relationship between the right pixel position and the right lens detection position based on the right pixel position and the right lens detection position; an adjustment position determination unit which sets each of the left lens detection position and the right lens detection position in the generated characteristic as a correction object position and determines an adjustment position which is a position on the straight line connecting the left pixel position and the right pixel position corresponding to the correction object position with respect to each correction object position; and a correction value calculation unit which calculates correction values which are differences between the left lens detection position and the right lens detection position corresponding to the adjustment position and the correction object position with respect to each correction object position in the generated characteristic. Accordingly, it is possible to obtain a function in that the differences between the left lens detection position and the right lens detection position corresponding to the adjustment position and the correction object position is calculated as a correction value for each of the correction object positions.

In addition, in the first embodiment, the adjustment position determination unit may set an intermediate point between the left pixel position and the right pixel position as the adjustment position. Accordingly, it is possible to obtain a function in that the correction value is calculated from the intermediate point between the left pixel position and the right pixel position.

In addition, in the first embodiment, the adjustment position determination unit may set the left pixel position or the right pixel position as the adjustment position. Accordingly, it is possible to obtain a function in that the correction value is calculated from the left pixel position or the right pixel position.

In addition, in the first embodiment, the adjustment position determination unit may set an intersection point of a predetermined straight line and a straight line connecting the left pixel position and the right pixel position as the adjustment position. Accordingly, it is possible to obtain a function in that the correction value is calculated from the adjustment position on the predetermined straight line.

In addition, in the first embodiment, the correction value calculation apparatus may further include: a correction value storage unit which stores the calculated correction values with respect to the correction object positions; and a correction value output unit which is input with a manipulation signal indicating outputting of the correction value and reads and outputs the correction value corresponding to the correction object position in the case where the left lens detection position or the right lens detection position coincident with any one of the correction object positions is detected. Accordingly, it is possible to obtain a function in that the correction value corresponding to the correction object position is output.

In addition, according to a second embodiment of the present disclosure, there is provided a compound eye imaging apparatus including: a left lens; a right lens; a left lens driving unit which moves the left lens according to a plurality of indication values indicating a plurality of positions; a right lens driving unit which moves the right lens according to the plurality of the indication values; a left image processing unit which acquires a relative position of a feature point to a reference point in a left image formed by the left lens as a left pixel position with respect to indication values in the case where the left lens is moved according to a plurality of the indication values; a right image processing unit which acquires a relative position of the feature point to the reference point in a right image formed by the right lens as a right pixel position with respect to the indication values in the case where the right lens is moved according to the plurality of the indication values; a left lens position detection unit which detects the relative position of the left lens to the reference position as a left lens detection position in the case where the left lens is moved according to the plurality of the indication values; a right lens position detection unit which detects the relative position of the right lens to the reference position as a right lens detection position in the case where the right lens is moved according to the plurality of the indication values; a characteristic generation unit which generates a characteristic representing a relationship between the left pixel position and the left lens detection position based on the left pixel position and the left lens detection position and generates a characteristic representing a relationship between the right pixel position and the right lens detection position based on the right pixel position and the right lens detection position; an adjustment position calculation unit which sets each of the left lens detection position and the right lens detection position in the generated characteristic as a correction object position and calculates an adjustment position which is a position on the straight line connecting the left pixel position and the right pixel position corresponding to the correction object position with respect to each correction object position; a correction value determination unit which determines correction values which are differences between the left lens detection position and the right lens detection position corresponding to the adjustment position and the correction object position with respect to the correction object positions in the generated characteristic; a correction value storage unit which stores the calculated correction values with respect to the correction object positions; a correction value output unit which is input with a manipulation signal indicating outputting of the correction value and reads and outputs the correction value corresponding to the correction object position in the case where the left lens detection position or the right lens detection position coincident with any one of the correction object positions is detected; and an addition unit which adds the calculated correction value to the indication value and outputs the indication value added with the correction value to the left lens driving unit or the right lens. Accordingly, it is possible to obtain a function in that the differences between the left lens detection position and the right lens detection position corresponding to the adjustment position and the correction object position is calculated as a correction value for each of the correction object positions.

In addition, according to a third embodiment of the present disclosure, there is provided a compound eye imaging apparatus including: a left lens; a right lens; a left lens driving unit which moves the left lens according to a plurality of indication values indicating a plurality of positions; a right lens driving unit which moves the right lens according to the plurality of the indication values; a left image processing unit which captures a left image formed by the left lens; a right image processing unit which captures a right image formed by the right lens; a left lens position detection unit which detects the relative position of the left lens to the reference position as a left lens detection position in the case where the left lens is moved according to the plurality of the indication values; a right lens position detection unit which detects the relative position of the right lens to the reference position as a right lens detection position in the case where the right lens is moved according to the plurality of the indication values; a correction value storage unit which stores the correction values with respect to the correction object positions; a correction value output unit which is input with a manipulation signal indicating outputting of the correction value and reads and outputs the correction value corresponding to the correction object position in the case where the left lens detection position or the right lens detection position coincident with any one of the correction object positions is detected; and an addition unit which adds the calculated correction value to the indication value and outputs the indication value added with the correction value to the left lens driving unit or the right lens. Accordingly, it is possible to obtain a function in that the correction value corresponding to the correction object position is added to the indication value, and the indication value added with correction value is output to the left lens driving unit or the right lens.

In addition, in the third embodiment, the compound eye imaging apparatus may further include a hand blur correction unit which sets a size of an image-capturable area in the left image and the right image and changes a position of the image-capturable area in the left image and the right image so that the subject is included within the image-capturable area. Accordingly, it is possible to obtain a function in that the position of the image-capturable area is changed so that the subject is included within the image-capturable area.

According to the present disclosure, even in the case where the errors of the detection values of the two position sensors are different, it is possible to obtain excellent effect in that images which may be easily used for stereoscopic viewing may be captured.

BRIEF DESCRIPTION OF THE DRAWINGS

FIG. 13 is a table listing an example of correction values according to the first embodiment of the present disclosure;

DETAILED DESCRIPTION OF EMBODIMENTS

Hereinafter, embodiments (hereinafter, referred to as embodiments) for embodying the present disclosure will be described. The description is made in the following order.
1. First Embodiment (Example of Correction Based on Intermediate Value)
2. Second Embodiment (Example of Correction by Alignment of Right and Left Sides)
3. Third Embodiment (Example of Further Performing Electronic Hand Blur Correction)

<1. First Embodiment>
[Example of Configuration of Compound Eye Imaging Apparatus]

Figure 1:
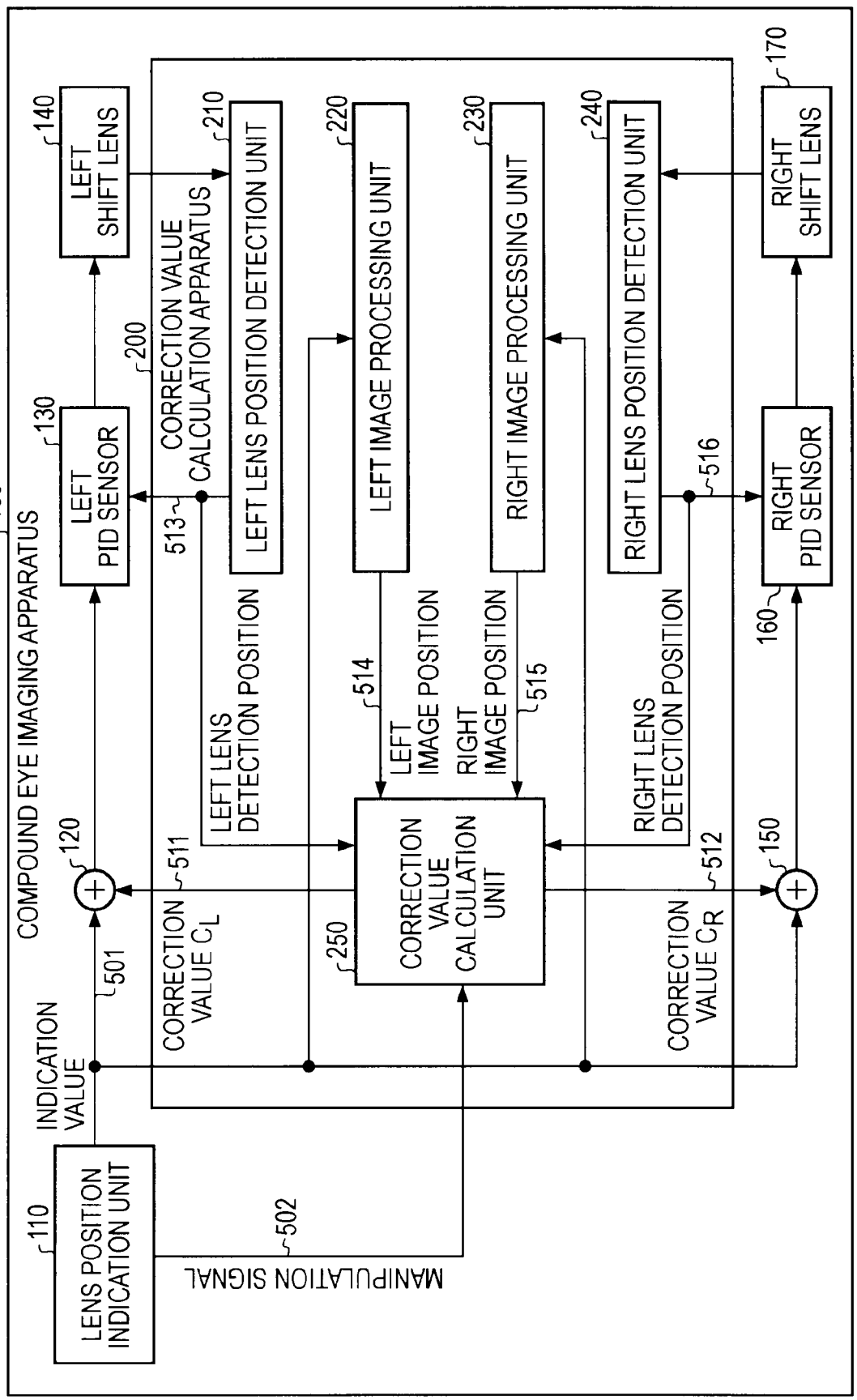
FIG. 1 is a block diagram illustrating an example of a configuration of a compound eye imaging apparatus according to a first embodiment of the present disclosure.

FIG. 1 is a block diagram illustrating an example of a configuration of a compound eye imaging apparatus 100 according to an embodiment of the present disclosure. The compound eye imaging apparatus 100 includes a lens position indication unit 110, adders 120 and 150, a left PID servo 130, a left shift lens 140, a right PID servo 160, a right shift lens 170, and a correction value calculation apparatus 200. The correction value calculation apparatus 200 includes a left lens position detection unit 210, a left image processing unit 220, a right image processing unit 230, a right lens position detection unit 240, and a correction value calculation unit 250.

The lens position indication unit 110 indicates positions of movement destinations of the left shift lens 140 and the right shift lens 170. The lens position indication unit 110 generates a plurality of indication values indicating a plurality of positions and outputs the indication values through a signal line 501 to the adders 120 and 150 and the correction value calculation unit 250. The positions include at least one of a coordinate on the pitch axis and a coordinate on the yaw axis. Herein, when the surface where the left shift lens 140 and the right shift lens 170 are exposed is set as the front surface of the compound eye imaging apparatus 100, the pitch axis is an axis penetrating the apparatus in the left-right direction. The yaw axis is an axis penetrating the compound eye imaging apparatus 100 in the direction from the top surface thereof to the bottom thereof. In addition, the indication values indicate the coordinates by setting the reference positions of the left shift lens 140 and the right shift lens 170 as the origin. For example, in the pitch axis, the coordinates of the intersection point of the central axis of each shift lens and the pitch axis are set as the origin of each shift lens. In other words, the position indicated by the indication value is a relative position with respect to the reference position. The unit of each position is, for example, "µm".

In addition, the lens position indication unit 110 generates a manipulation signal and outputs the manipulation signal through a signal line 502 to the correction value calculation apparatus 200. The manipulation signal is a signal indicating whether or not to proceed to an adjustment mode based on user's manipulation. The adjustment mode is a mode where the correction value calculation apparatus 200 calculates a correction value for correcting the indication value.

In the adjustment mode, every time the indication value is output, an image of a predetermined subject is captured by the compound eye imaging apparatus 100. A subject of which the feature point may be easily detected is used. For example, a test chart where a white polygon is illustrated on a black cloth is photographed as a subject, and vertices of the polygon are set as feature points of the detection object. The image captured from the subject is processed by the left image processing unit 220 and the right image processing unit 230.

The adder 120 adds the indication value and the correction value $C_L$. The adder 120 receives the indication value from the lens position indication unit 110 and receives the correction value $C_L$ from the correction value calculation apparatus 200. The correction value $C_L$ is a value for correcting the indication value. A calculation method of deriving the correction value $C_L$ will be described later. The adder 120 adds the correction value $C_L$ to the indication value and outputs the result thereof as a target value to the left PID servo 130.

The left PID servo 130 moves the left shift lens 140 to a position indicated by the target value. The left PID servo 130 receives the target value from the adder 120 and receives the left lens detection position, that is, the position of the left shift lens 140, detected by the left lens position detection unit 210 from the left lens position detection unit 210. The left PID servo 130 outputs a sum of a proportional action (P action), an integral action (I action), and a derivative action (D action). The left PID servo 130 performs PID controlling so that the left lens detection position is controlled to be the target value.

The left shift lens 140 is a lens which forms the left eye image on the imaging device. The left shift lens 140 is moved along the pitch axis and the yaw axis by the left PID servo 130.

The adder 150 adds the correction value $C_R$ to the indication value. The correction value $C_R$ is a value for correcting the indication value. A calculation method for deriving the correction value $C_R$ will be described later. The adder 150 adds the correction value $C_R$ to the indication value and outputs the result thereof as a target value to the right PID servo 160.

The right PID servo 160 moves the right shift lens 170 to the target value. The right PID servo 160 receives the target value from the adder 150 and receives the right lens detection position, that is, the position of the right shift lens 170, detected by the right lens position detection unit 240 from the right lens position detection unit 240. The right PID servo 160 outputs a sum of a proportional action, an integral action, and a derivative action, so that the right lens detection position is controlled to be the target value.

The right shift lens 170 is a lens which forms the right eye image on the imaging device. The right shift lens 170 is moved along the pitch axis and the yaw axis by the right PID servo 160.

The left lens position detection unit 210 detects the position of the left shift lens 140. The left lens position detection unit 210 detects the position of the left shift lens 140 by using the position sensor such as a Hall sensor. The position of the detection object is a relative position with respect to the reference position of the left shift lens 140. The left lens position detection unit 210 outputs the detected position as the left lens detection position through a signal line 513 to the left PID servo 130 and the correction value calculation unit 250.

The left lens detection position is detected by the position sensor. However, as described above, due to deviation in the performance of the position sensor or the installation position, an error may occur in the left lens detection position with respect to the actual position of the left shift lens 140.

The left image processing unit 220 acquires the left pixel position. The left pixel position is a position of a feature point in the left image formed by the left shift lens 140. For example, the feature point is detected by performing an edge diction process on a subject reflected on each image. A plurality of indication values are input from the lens position indication unit 110 to the left image processing unit 220. Every time the indication value is input, the left image processing unit 220 performs an image process on the left image to acquire the left pixel position. When the position of the feature point corresponding to the reference position of the left shift lens 140 is set to as a reference point, the coordinate of each left pixel position is a relative coordinate with respect to the reference point. The left image processing unit 220 outputs the acquired left pixel position through a signal line 514 to the correction value calculation unit 250.

Herein, the feature point is changed in the left image according to the movement of the left shift lens 140. Therefore, an accurate position of the left shift lens 140 is obtained from the left pixel position, that is, the relative position of the feature point.

The right image processing unit 230 acquires the right pixel position. The right pixel position is a position of a feature point in the right image formed by the right shift lens 170. A plurality of indication values are input from the lens position indication unit 110 to the right image processing unit 230. Every time the indication value is input, the right image processing unit 230 performs an image process on the right image to acquire the right pixel position. The right image processing unit 230 output the acquired right pixel position through a signal line 515 to the correction value calculation unit 250.

The right lens position detection unit 240 detects the position of the right shift lens 170. The position of the detection object of the right lens position detection unit 240 is a relative position with respect to the reference position of the right shift lens 170. The right lens position detection unit 240 outputs the detected position as the right lens detection position through a signal line 516 to the right PID servo 160 and the correction value calculation unit 250.

The correction value calculation unit 250 calculates the correction value based on the left lens detection position, the left pixel position, the right lens detection position, and the right pixel position. The correction value calculation unit 250 receives the left lens detection position, the left pixel position, the right lens detection position, and the right pixel position from the left lens position detection unit 210, the left image processing unit 220, the right image processing unit 230, and the right lens position detection unit 240, respectively. In addition, the correction value calculation unit 250 receives a manipulation signal from the lens position indication unit 110.

In the case where the manipulation signal is a signal indicating the adjustment mode, the correction value calculation unit 250 sets any one of the right lens detection position and the left lens detection position as the correction object position and calculates the correction values $C_L$ and $C_R$ for each correction object position. The correction value calculation method will be described later. The correction value calculation unit 250 stores each correction value for each correction object position. The correction value calculation in the adjustment mode is performed for example, before shipment from the factory in order to reduce the deviation between the movement amount of the right image and the movement amount of the left image in the hand blur correction.

In the case where the manipulation signal is not a signal indicating the adjustment mode, the correction value calculation unit 250 determines whether or not the left lens detection position or the right lens detection position is coincident with the correction object position. If the lens detection position is coincident with the correction object position, the correction value calculation unit 250 reads each correction value corresponding to the correction object position and outputs the correction value through the signal lines 511 and 512 to the adders 120 and 150.

In addition, the left shift lens 140 is an example of a left lens disclosed in the embodiments of the present disclosure. The right shift lens 170 is an example of a right lens disclosed in the embodiments of the present disclosure. The left PID servo 130 is an example of a left lens driving unit disclosed in the embodiments of the present disclosure. The right PID servo 160 is an example of a right lens driving unit disclosed in the embodiments of the present disclosure.

Figure 2:
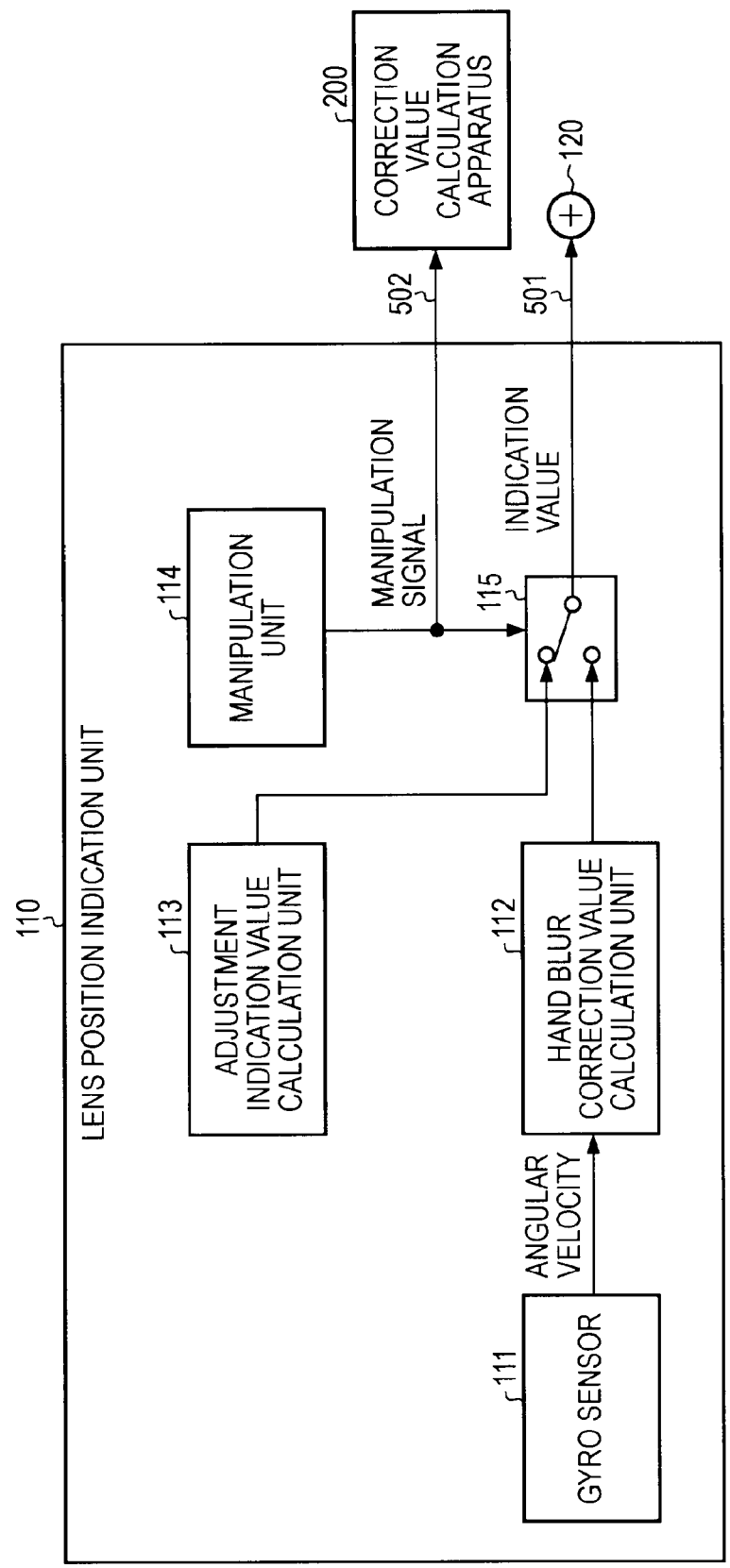
FIG. 2 is a block diagram illustrating an example of a configuration of a lens position indication unit according to the first embodiment of the present disclosure.

FIG. 2 is a block diagram illustrating an example of a configuration of the lens position indication unit 110 according to the first embodiment of the present disclosure. The lens position indication unit 110 includes a gyro sensor 111, a hand blur correction value calculation unit 112, an adjustment indication value calculation unit 113, a manipulation unit 114, and a selector 115.

The gyro sensor 111 detects an angular velocity of the compound eye imaging apparatus 100. The gyro sensor 111 outputs the detected angular velocity to the hand blur correction value calculation unit 112.

The hand blur correction value calculation unit 112 calculates a hand blur correction value for removing hand blur. The hand blur correction value calculation unit 112 detects the hand blur based on the angular velocity input by the gyro sensor 111. The hand blur correction value calculation unit 112 calculates the hand blur correction value for moving the left shift lens 140 and the right shift lens 170 in the direction for removing the detected hand blur and outputs the hand blur correction value as an indication value to the selector 115.

The adjustment indication value calculation unit 113 calculates an indication value used for the adjustment mode. The adjustment indication value calculation unit 113 calculates a plurality of indication values indicating a plurality of positions in the movable range of the left shift lens 140 and the right shift lens 170 based on the specification of the left shift lens 140 and the right shift lens 170. The adjustment indication value calculation unit 113 outputs each of the calculated indication values to the selector 115.

The manipulation unit 114 generates a manipulation signal according to user's manipulation. The manipulation unit 114 outputs the generated manipulation signal to the selector 115 and the correction value calculation apparatus 200.

The selector 115 selects one of the indication values from the adjustment indication value calculation unit 113 and the indication value of the hand blur correction value calculation unit 112 based on the manipulation signal. In the case where the manipulation signal is the signal indicating the adjustment mode, the selector 115 selects the indication value from the adjustment indication value calculation unit 113. In the case where the manipulation signal is not the signal indicating the adjustment mode, the selector 115 selects the indication value from the hand blur correction value calculation unit 112. The selector 115 outputs the selected indication value to the adders 120 and 150 and the correction value calculation apparatus 200.

Figure 3:
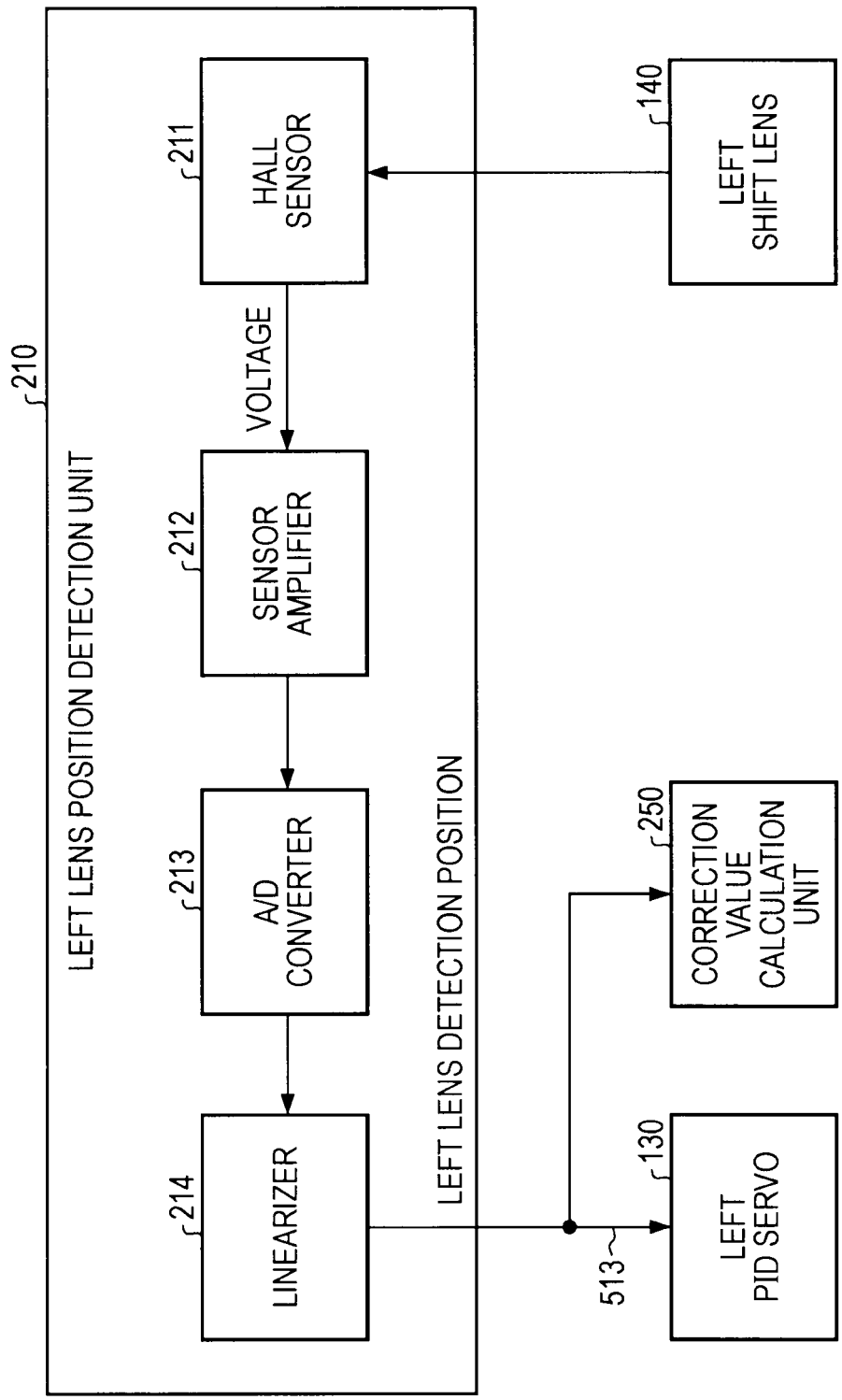
FIG. 3 is a block diagram illustrating an example of a configuration of a left lens position detection unit according to the first embodiment of the present disclosure.

FIG. 3 is a block diagram illustrating an example of a configuration of the left lens position detection unit 210. The left lens position detection unit 210 includes a Hall sensor 211, a sensor amplifier 212, an A/D converter 213, and a linearizer 214. The configuration of the right lens position detection unit 240 is the same as that of the left lens position detection unit 210.

The Hall sensor 211 detects the position of the left shift lens 140 by using the Hall effect. A voltage of an electrical signal indicating the lens position detected by the Hall sensor 211 is supplied as a measurement value to the sensor amplifier 212.

The sensor amplifier 212 adjusts the voltage output from the Hall sensor 211. In the adjustment, the output voltage of the Hall sensor 211 of the case where the left shift lens 140 is located at the center is considered to be a reference voltage Vref. The sensor amplifier 212 adjusts a gain and an offset so that, in the case where the left shift lens 140 is located at the left end of the movable range and in the case where the left shift lens 140 is located at the right end of the movable range, the differences between the reference voltage Vref and the voltages of the Hall sensor 211 are equal to each other. The sensor amplifier 212 outputs the adjusted voltage to the A/D converter 213.

The A/D converter 213 converts an analog signal to a digital signal. The A/D converter 213 converts an analog electrical signal output from the sensor amplifier 212 to a digital signal and outputs the digital signal to the linearizer 214.

The linearizer 214 performs correction on the output voltage so that the relationship between the output voltage of the Hall sensor 211 and the position of the left shift lens 140 is linearized. The linearizer 214 performs linearization, for example, by inserting a value of the output voltage into a predetermined the polynomial. The linearizer 214 outputs the corrected output voltage as a left lens detection position to the left PID servo 130 and the correction value calculation unit 250.

Figure 4:
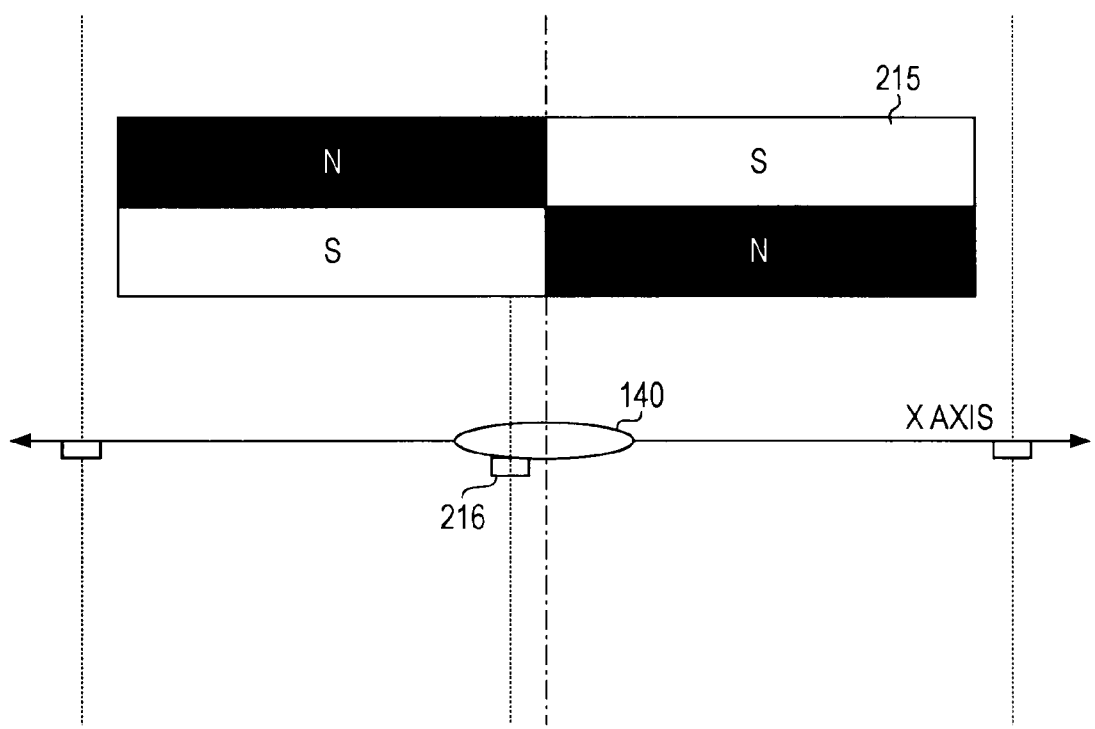
FIG. 4 is a diagram illustrating an example of a configuration of a Hall sensor according to the first embodiment of the present disclosure.

FIG. 4 is a diagram illustrating an example of a configuration of the Hall sensor 211 according to the first embodiment of the present disclosure. The Hall sensor 211 includes a magnet 215 and a Hall device 216.

The magnet 215 is installed so that a magnetic field is generated in the movable range of the left shift lens 140. The Hall device 216 converts a change in the magnetic field into an electrical signal by using the Hall effect. Since the magnetic field generated by the magnet 215 is changed according to the movement of the left shift lens 140, the Hall device 216 may detect the position of the left shift lens 140 by outputting the electrical signal according to the change in the magnetic field. In FIG. 4, the X axis is the pitch axis. The dashed dotted line is a line penetrating the center of the movable range of the left shift lens 140 in the pitch axis. The position of the center is set as the reference position, and the relative position with respect to the reference position is indicated by the indication value. In FIG. 4, the magnet and the Hall device in the yaw axis are not illustrated.

The Hall device 216 is preferably installed on the central axis of the left shift lens 140. However, among the Hall sensors, there is a Hall sensor which is installed at a position deviated from the central axis of the lens. If there is deviation in the position, in the case of performing precision measurement, for example, in units of micrometers, a non-negligible error may occur. In FIG. 4, the Hall device 216 is installed at a position deviated from the central axis of the lens.

Figure 5:
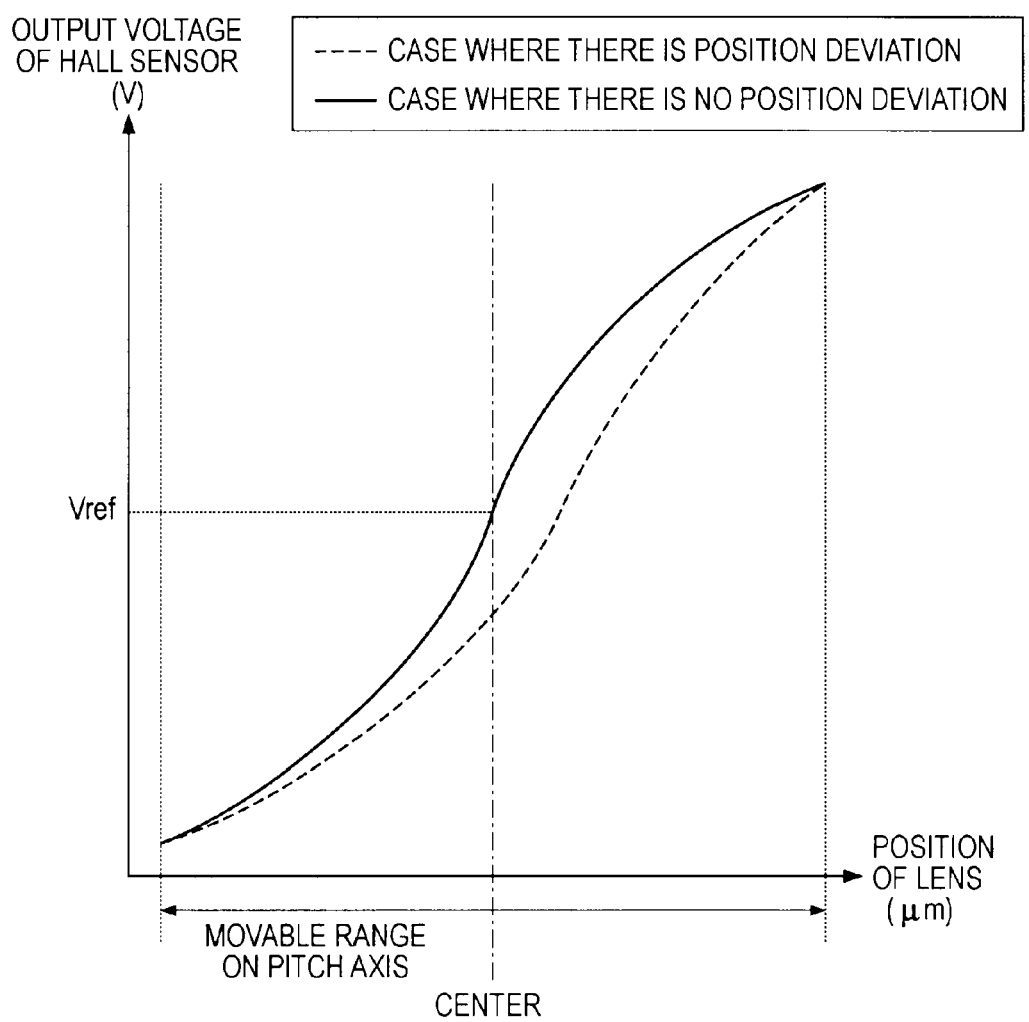
FIG. 5 is a graph illustrating an output voltage of the Hall sensor adjusted by a sensor amplifier according to the first embodiment of the present disclosure.

FIG. 5 is a graph illustrating an output voltage of the Hall sensor 211 adjusted by the sensor amplifier 212 according to the first embodiment of the present disclosure. In FIG. 5, the vertical axis represents the output voltage of the Hall sensor 211, and the horizontal axis represents the position of the left shift lens 140 on the pitch axis. The unit of the output voltage is V, and the unit of the position is μm. The dashed dotted line represents the center of the movable range of the left shift lens 140. The solid curved line is a curved line representing a relationship between the output voltage of the Hall sensor 211 and the position of the case where the installation position of the Hall device is not deviated from the central axis of the lens. The dotted curved line is a curved line representing a relationship between the output voltage of the Hall sensor 211 and the position of the case where the installation position of the Hall device is deviated from the central axis of the lens. In the aforementioned Hall sensor 211, the magnet or the Hall device is installed so that the curved line representing the relationship between the output voltage and the position becomes S-shaped and the voltage corresponding to an S-shaped inflection point at the center is output in the case where there is no deviation in position. However, in the case where there is deviation in position, there is a discrepancy between the change in the assumed magnetic field and the change in the measured magnetic field, so that the output voltage at the center is deviated from the inflection point.

Figure 6:
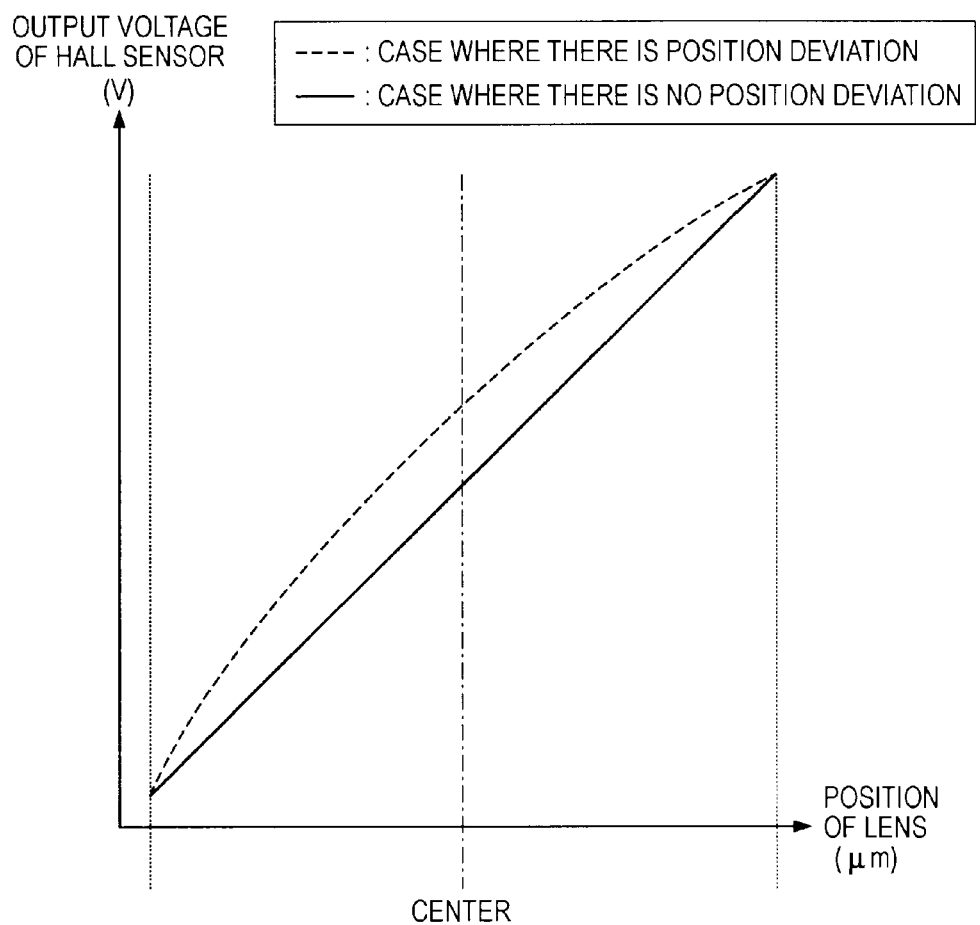
FIG. 6 is a graph illustrating a linearized output voltage of the Hall sensor according to the first embodiment of the present disclosure.

FIG. 6 is a graph illustrating the output voltage of the Hall sensor 211 linearized by the linearizer 214. In FIG. 6, the vertical axis represents the output voltage of the Hall sensor 211, and the horizontal axis represents the position of the left shift lens 140 on the pitch axis. The unit of the output voltage is V, and the unit of the position is μm. The dashed dotted line represents the center of the movable range of the left shift lens 140. By considering the case where there is no deviation in position, in a polynomial used in the linearization, coefficients thereof are set so that the relationship between the output voltage and the position becomes a solid straight line. Therefore, in the case where there is deviation in the installation position of the Hall device, if the linearization is performed by using the polynomial, the relationship between the output voltage and the position becomes a curved line illustrated by a dotted line. As a result, in the value of the left lens detection position, an error occurs with respect to the actual position of the left shift lens 140. The error is a difference between the curved line and the solid line. In many cases, since the differences for the output voltages may be different according to a shape of the curved line, the error does not have a constant value, and errors having different values may occur with respect to the output voltages.

Figure 7:
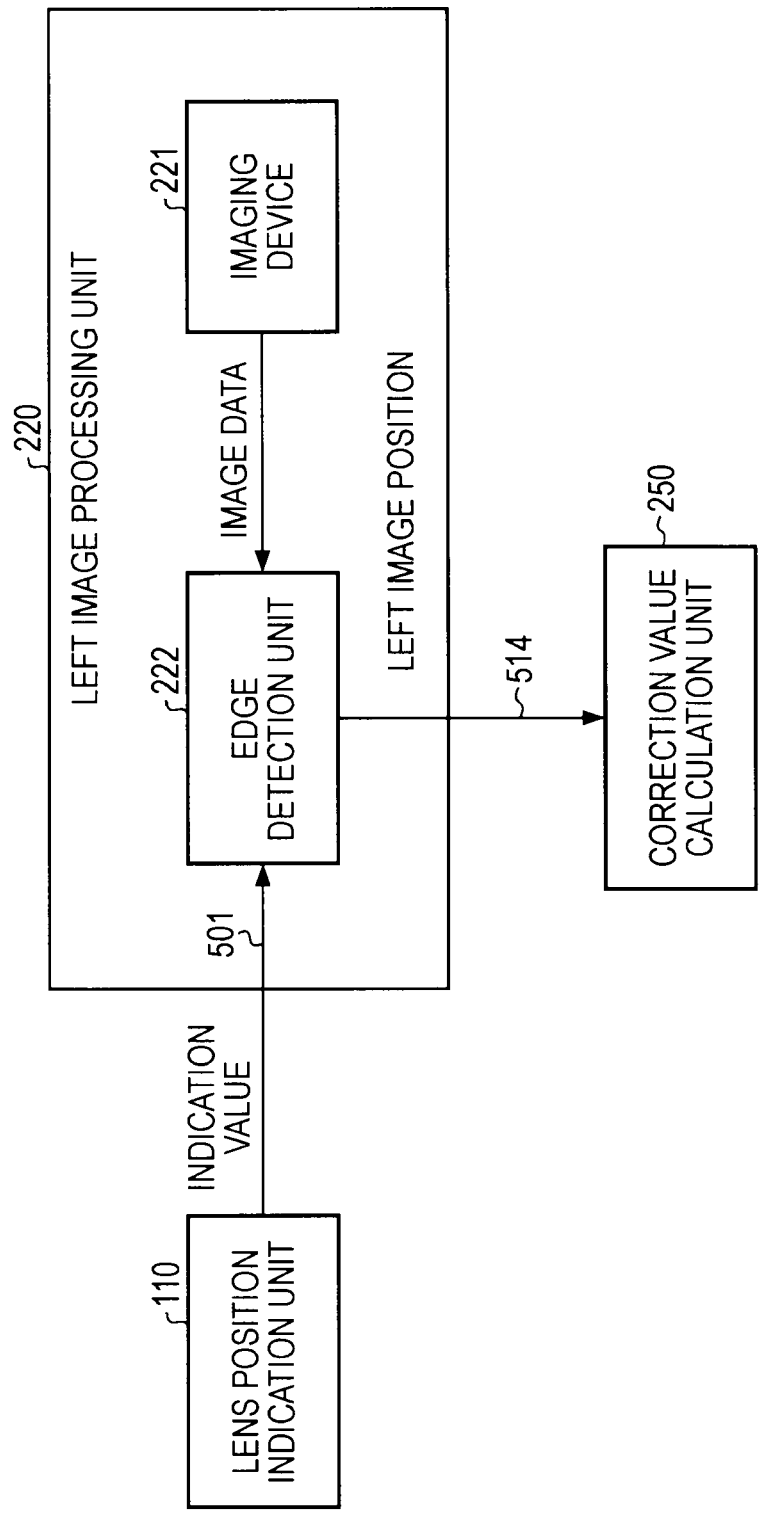
FIG. 7 is a block diagram illustrating an example of a configuration of a left image processing unit according to the first embodiment of the present disclosure.

FIG. 7 is a block diagram illustrating an example of a configuration of the left image processing unit 220 according to the first embodiment of the present disclosure. The left image processing unit 220 includes an imaging device 221 and an edge detection unit 222. The configuration of the right image processing unit 230 is the same as that of the left image processing unit 220.

The imaging device 221 converts light incident from the left shift lens 140 into an electrical signal. The image represented by image data including the generated electrical signal is a left image. The imaging device 221 outputs the image data to the edge detection unit 222.

The edge detection unit 222 acquires the left pixel position. The edge detection unit 222 receives the image data from the imaging device 221 and receives the indication value from the lens position indication unit 110. Every time the indication value is input, the edge detection unit 222 performs an edge detection process on the image data to acquire the left pixel position which is a position of the feature point of the subject. The edge detection unit 222 outputs the left pixel position to the correction value calculation unit 250.

Figure 8:
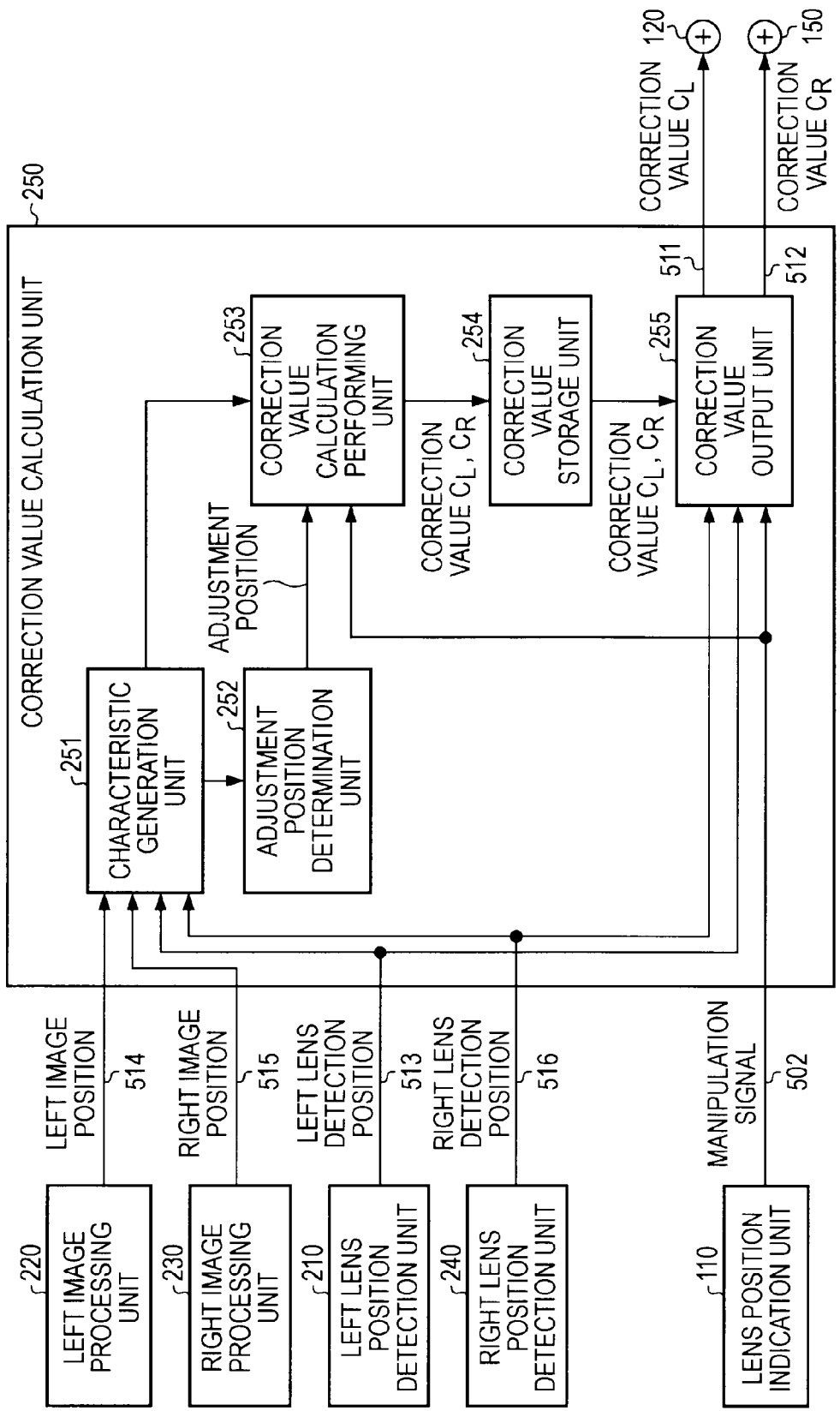
FIG. 8 is a block diagram illustrating an example of a configuration of a correction value calculation unit according to the first embodiment of the present disclosure.

FIG. 8 is a block diagram illustrating an example of a configuration of the correction value calculation unit 250. The correction value calculation unit 250 includes a characteristic generation unit 251, an adjustment position determination unit 252, a correction value calculation performing unit 253, a correction value storage unit 254, and a correction value output unit 255.

The characteristic generation unit 251 generates the characteristics of the position sensors attached to the left shift lens 140 and the right shift lens 170. The characteristic generation unit 251 acquires the left pixel position from the left image processing unit 220, the right pixel position from the right image processing unit 230, the left lens detection position from the left lens position detection unit 210, and the right lens detection position from the right lens position detection unit 240. In addition, the characteristic generation unit 251 generates the characteristic of the left Hall sensor and the characteristic of the right Hall sensor. The characteristic of the left Hall sensor is a characteristic representing the relationship between the left pixel position and the left lens detection position. The characteristic of the right Hall sensor is a characteristic representing the relationship between the right pixel position and the right lens detection position.

Herein, as described above with reference to FIG. 1, in the adjustment mode, no correction value is output from the correction value calculation apparatus 200. Therefore, the same indication value is input to the left PID servo 130 and the right PID servo 160. In the PID servos, since the left shift lens 140 and the right shift lens 170 are moved until the lens detection positions are equal to the indication value, the left lens detection position and the right lens detection position has the same value as that of the indication value. As described above, since an error may occur in the left lens detection position and the right lens detection position, correction is necessarily performed in order to reduce the influence of the error. Therefore, the left and right lens detection positions which are to be detected are referred to as correction object positions.

The characteristic generation unit 251 stores the left pixel position and the right pixel position in correspondence with the correction object positions. The characteristic generation unit 251 outputs each correction object position and each pixel position to the adjustment position determination unit 252 and the correction value calculation performing unit 253.

The adjustment position determination unit 252 determines the adjustment position. The adjustment position is a position set as a reference in the case of adjusting the correction object position. More specifically, in the characteristics of the respective Hall sensors, a point on a straight line connecting the left pixel position and the right pixel position is set to the adjustment position. For example, the adjustment position determination unit 252 generates a difference vector having one of the left pixel position and the right pixel position as the starting point and the other as the ending point for each correction object position. In addition, the adjustment position determination unit 252 determines the intermediate point of the difference vector as the adjustment position and calculates the adjustment position for each correction object position. The adjustment position determination unit 252 outputs each adjustment position to the correction value calculation performing unit 253.

The correction value calculation performing unit 253 calculates the correction value for each correction object position. The correction value calculation performing unit 253 acquires the characteristic generated by the characteristic generation unit 251, the adjustment position from the adjustment position determination unit 252 and the manipulation signal from the lens position indication unit 110. If the manipulation signal is a signal indicating the adjustment mode, the correction value calculation performing unit 253 calculates the differences between the left lens detection position and the right lens detection position corresponding to the adjustment position and the correction object position in the characteristics of the respective Hall sensors with respect to the correction object positions. The correction value calculation performing unit 253 calculates the calculated differences as the correction values $C_L$ and $C_R$. The correction value calculation performing unit 253 outputs the calculated correction values to the correction value storage unit 254.

The correction value storage unit 254 stores the correction values. The correction value storage unit 254 stores the correction values $C_L$ and $C_R$ in correspondence to the correction object positions.

The correction value output unit 255 outputs the correction values $C_L$ and $C_R$ corresponding to the correction object positions. The correction value output unit 255 receives a manipulation signal from the lens position indication unit 110 and receives the left lens detection position and the right lens detection position from the left lens position detection unit 210 and the right lens position detection unit 240. If the manipulation signal is not a signal indicating an adjustment mode, the correction value output unit 255 determines whether or not the left lens detection position or the right lens detection position is equal to any one of the correction object positions. If the left lens detection position is equal to any one of the correction object positions, the correction value output unit 255 reads the correction value $C_L$ corresponding to the correction object position from the correction value storage unit 254 and outputs the correction value $C_L$ to the adder 120. If the right lens detection position is equal to any one of the correction object positions, the correction value output unit 255 reads the correction value $C_R$ corresponding to the correction object position from the correction value storage unit 254 and outputs the correction value $C_R$ to the adder 150.

Figure 9:
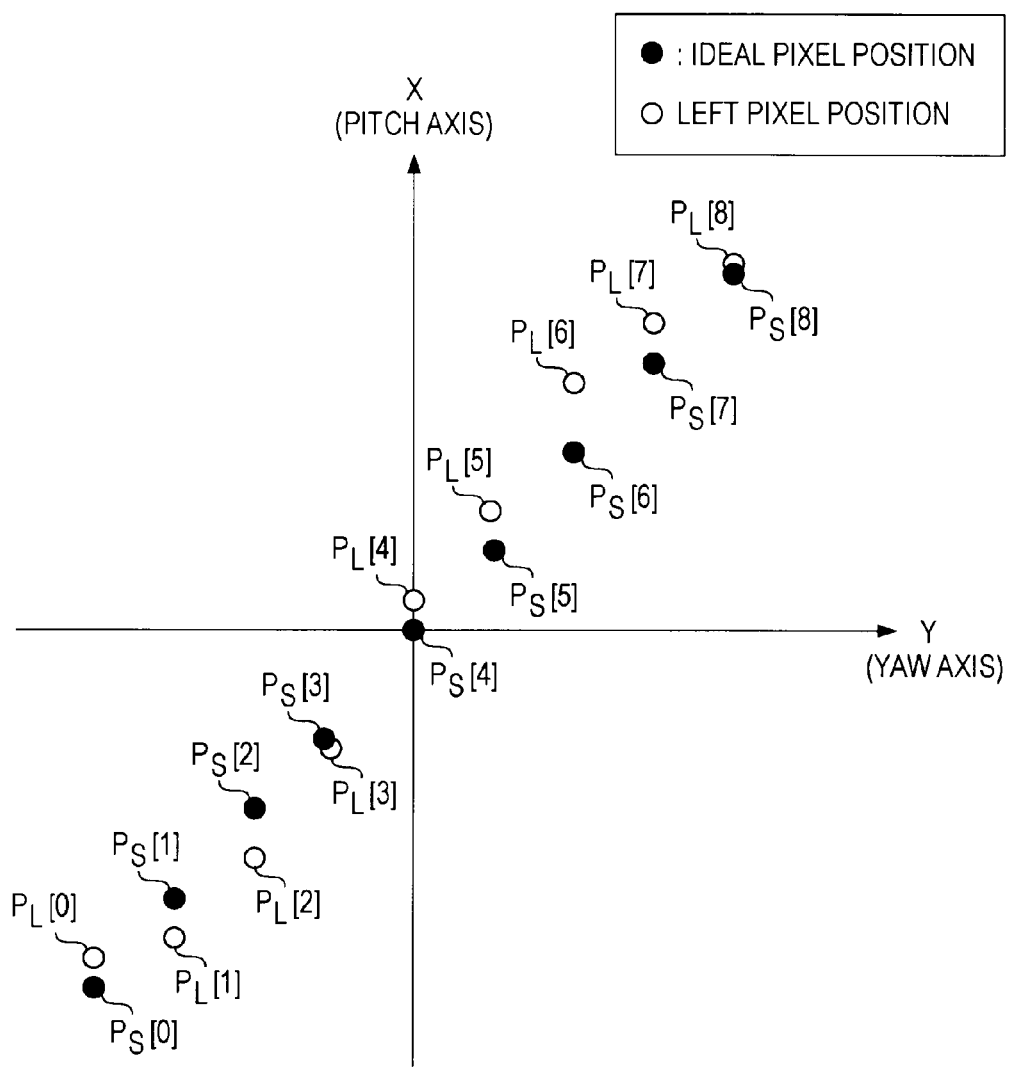
FIG. 9 is a graph where left pixel positions are plotted according to the first embodiment of the present disclosure.

An example of the result of the correction value calculation will be described with reference to FIGS. 9 to 12. FIG. 9 is a graph where the acquired left pixel positions are plotted in a coordinate system constructed with a pitch axis and a yaw axis. In FIG. 9, the X axis is the pitch axis, and the Y axis is the yaw axis. The measurement points $P_L[i]$ (i is an integer of 0 to 8) are the left pixel positions. The measurement point $P_S[i]$ is the left pixel position acquired in the ideal case where there is no error in a detection value of the left Hall sensor. In the case where there is an error in a detection value of the left Hall sensor, the measurement point $P_L[i]$ is not coincident with the measurement point $P_S[i]$. A difference between the measurement point $P_L[i]$ and the measurement point $P_S[i]$, that is, an error, becomes a different value according to the correction object position.

Figure 10:
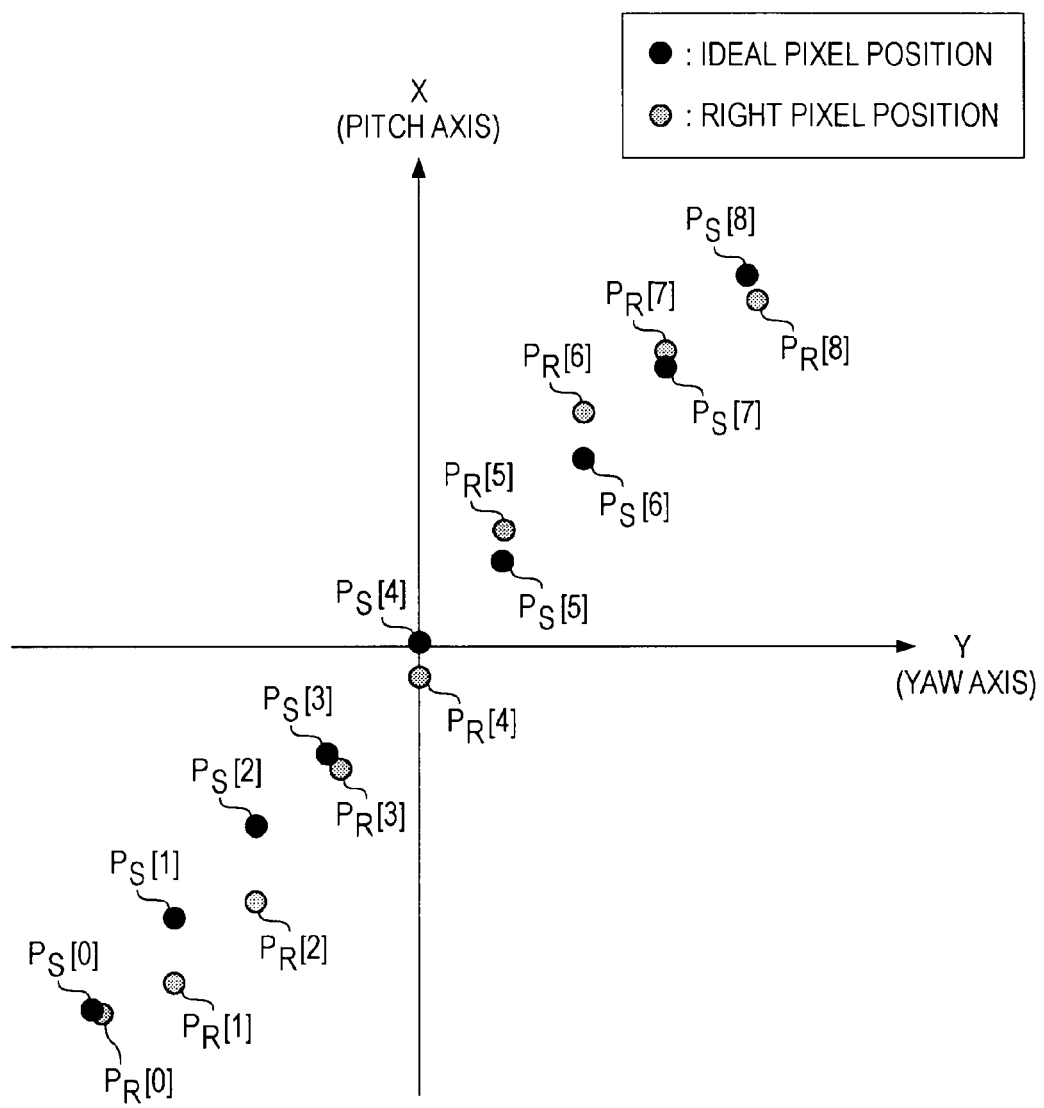
FIG. 10 is a graph where right pixel positions are plotted according to the first embodiment of the present disclosure.

FIG. 10 is a graph where the acquired right pixel positions are plotted in a coordinate system constructed with a pitch axis and a yaw axis. In FIG. 10, the X axis is the pitch axis, and the Y axis is the yaw axis. The measurement points $P_R[i]$ are the right pixel positions. The measurement points $P_R[i]$ and the measurement points $P_S[i]$ are not coincident with each other, so that the error also occurs in the right Hall sensor.

Figure 11:
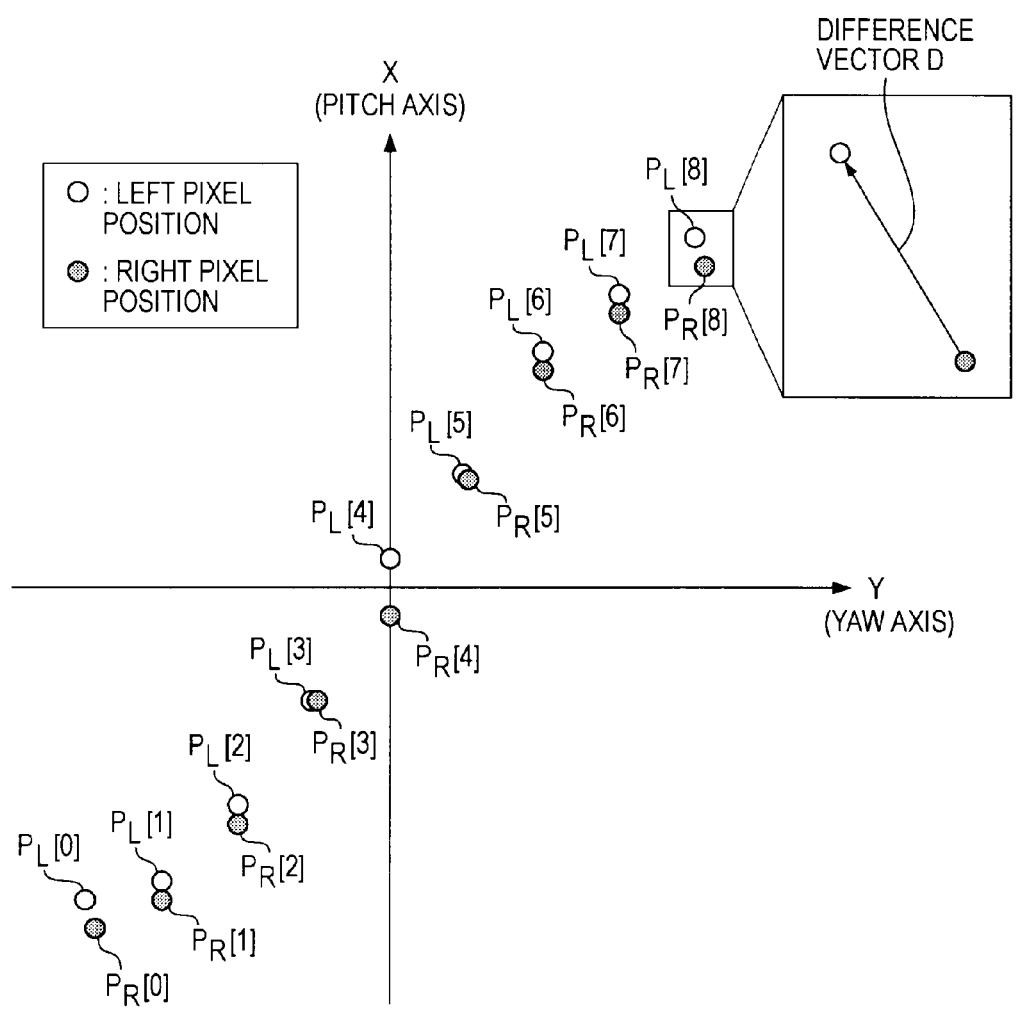
FIG. 11 is a graph where left pixel positions and right pixel positions are plotted according to the first embodiment of the present disclosure.

FIG. 11 is a graph where the right pixel positions and the left pixel positions are plotted in a coordinate system constructed with a pitch axis and a yaw axis. Since the error occurs in the detection value of each of the right and left Hall sensors and the values of the errors are also different, each of the correction object positions are in the state where the measurement point $P_L[i]$ and the measurement point $P_R[i]$ are not coincident. The adjustment position determination unit 252 sets a point on a straight line connecting the measurement points $P_R[i]$ and $P_L[i]$ as the adjustment position for each correction object position. For example, the adjustment position determination unit 252 generates a difference vector D[i] having one of the measurement points $P_R[i]$ and $P_L[i]$ as the starting point and the other as the ending point and calculates the intermediate point of the differences vector as the adjustment position.

Figure 12:
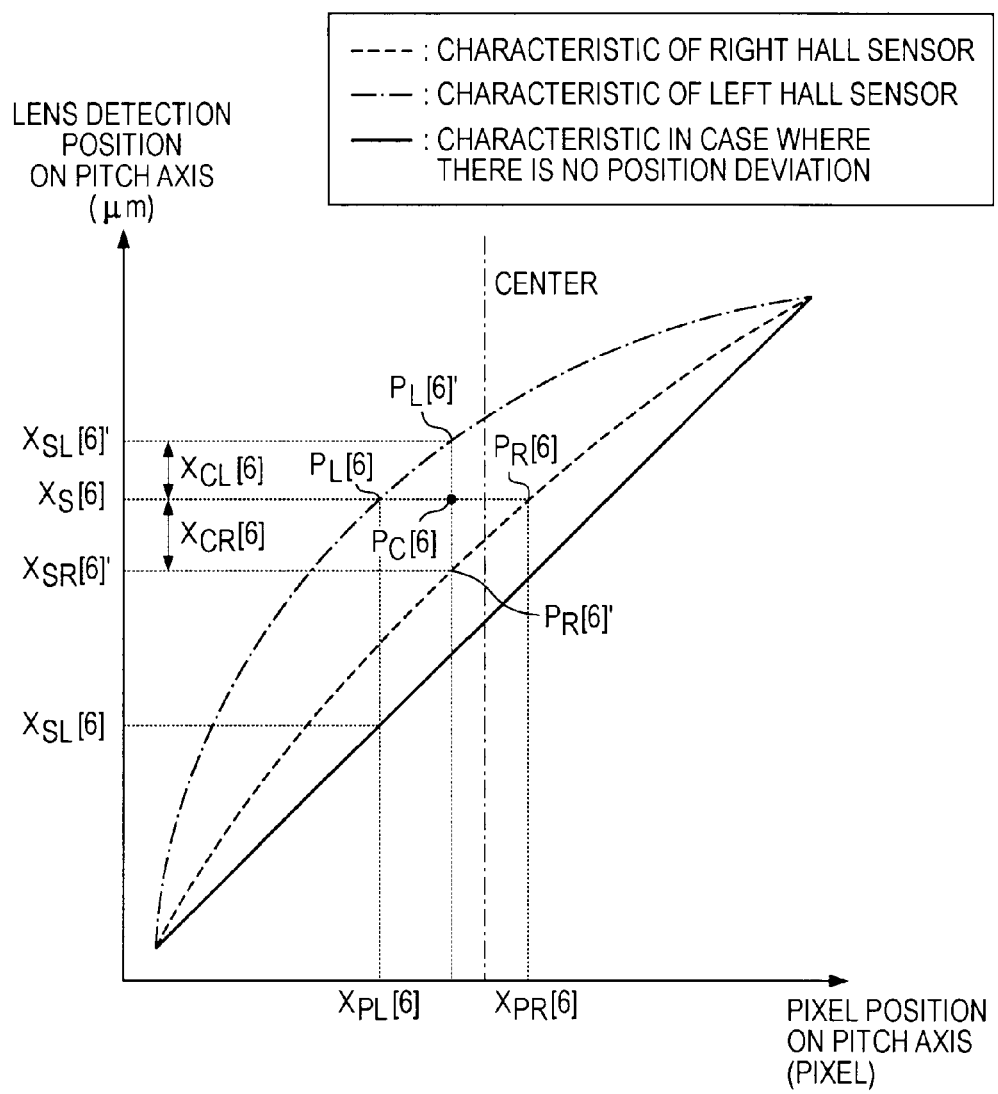
FIG. 12 is a graph illustrating characteristics of Hall sensors according to the first embodiment of the present disclosure.

FIG. 12 is a graph illustrating the characteristics of the respective Hall sensors according to the first embodiment of the present disclosure. In FIG. 12, the vertical axis represents the left lens detection position and the right lens detection position on the pitch axis, and the horizontal axis represents the left pixel position and the right pixel position on the pitch axis. In FIGS. 9 to 11, the X axis corresponds to the horizontal axis in FIG. 12. The dotted line represents the characteristic of the right Hall sensor, and the dashed dotted line represents the characteristic of the left Hall sensor. The solid line represents the characteristic of an ideal Hall sensor where no error occurs in the detection value thereof. The measurement points except for the measurement points $P_L[6]$ and $P_R[6]$ which are detected in the seventh measurement are not illustrated in FIG. 12. Xp[6] is the seventh correction object position. The measurement points $P_L[6]$ and $P_R[6]$ are the measurement points on the characteristic curves corresponding to Xp[6]. Pc[6] is the adjustment position corresponding to Xp[6]. In FIG. 12, the measurement points and the adjustment positions corresponding to the correction object positions except for Xp[6] are not illustrated.

As illustrated in FIG. 12, at the correction object positions having the same value, that is, the indication value, the pixel positions $X_{PL}[6]$ and $X_{PR}[6]$ of the measurement points $P_L[6]$ and $P_R[6]$ are different from each other. This is because an error occurs in the detection value of the respective Hall sensors with respect to an actual position of the shift lens. For example, the case where the left pixel position $X_{PL}[6]$ is acquired at the correction object position $X_S[6]$ is considered. The actual position of the left shift lens 140 estimated from the above value is the position $X_{SL}[6]$ corresponding to the left pixel position $X_{PL}[6]$ in an ideal straight line where there is no deviation in position. In this case, it is estimated that an error occurs in the correction object position $X_S[6]$, with respect to the actual position $X_{SL}[6]$ of the left shift lens 140. In addition, it is estimated that an error occurs in the right pixel position $X_{PR}[6]$ with respect to the actual position of the right shift lens 170. In this manner, since an error occurs in each lens detection position, in the case where the correction object position Xp[6] is indicated, the respective Hall sensors output different values, and the shift lenses are moved to different positions. As a result, deviation may occur between the movement amount of the left image and the movement amount of the right image. The correction value calculation unit 250 calculates the correction value for correcting the correction object position so that the shift does not occur in the image.

More specifically, the correction value calculation unit 250 calculates the difference between the image detection position and the correction object position corresponding to the adjustment position as the correction value in each of the characteristic curves. In other words, by drawing a straight line which passes the adjustment position Pc[6] and is parallel to the vertical axis, the intersection points $P_L[6]'$ and $P_R[6]'$ between the straight line and the characteristic curves are obtained. The differences $X_{CL}[6]$ and $X_{CR}[6]$ between the lens detection positions $X_{PL}[6]$ and $X_{PR}[6]$ of the intersection points and the correction object position Xp[6] are the values of the correction values $C_L$ and $C_R$ on the pitch axis.

In the case where the correction value calculation unit 250 outputs the correction values after the adjustment mode is finished, the correction value calculation unit 250 outputs $X_{PL}[6]'$ and $X_{PR}[6]'$, which are obtained by adding the correction values to the indication values in the adders, as the target values to the PID servos. As a result, both of the feature points of the left image and the right image are moved to the adjustment positions Pc[6]. Therefore, no deviation occurs between the movement amount of the left image and the movement amount of the right image. With respect to the correction object positions, the correction value calculation unit 250 calculates the correction values $C_L$ and $C_R$ by using the same method.

FIG. 13 illustrates the correction values according to the first embodiment of the present disclosure. For example, the correction value storage unit 254 stores 9 sets of the correction values $C_L$ and $C_R$ in correspondence to 9 points of the correction object position Ps. Each correction object position Ps includes coordinates on the X and Y axes, and each correction value includes correction values on X and Y axes. The X axis is the pitch axis, and the Y axis is the yaw axis. For example, the case where 9 points are measured and each of the X correction value and the Y correction value is constructed with two bytes is considered. In this case, the necessary storage capacity of the correction value storage unit 254 is 9 (number of measured points)×2 (left and right side)×2 (X and Y)×2 byte)=72 bytes.

[Operation of Correction Value Calculation Apparatus]

Figure 14:
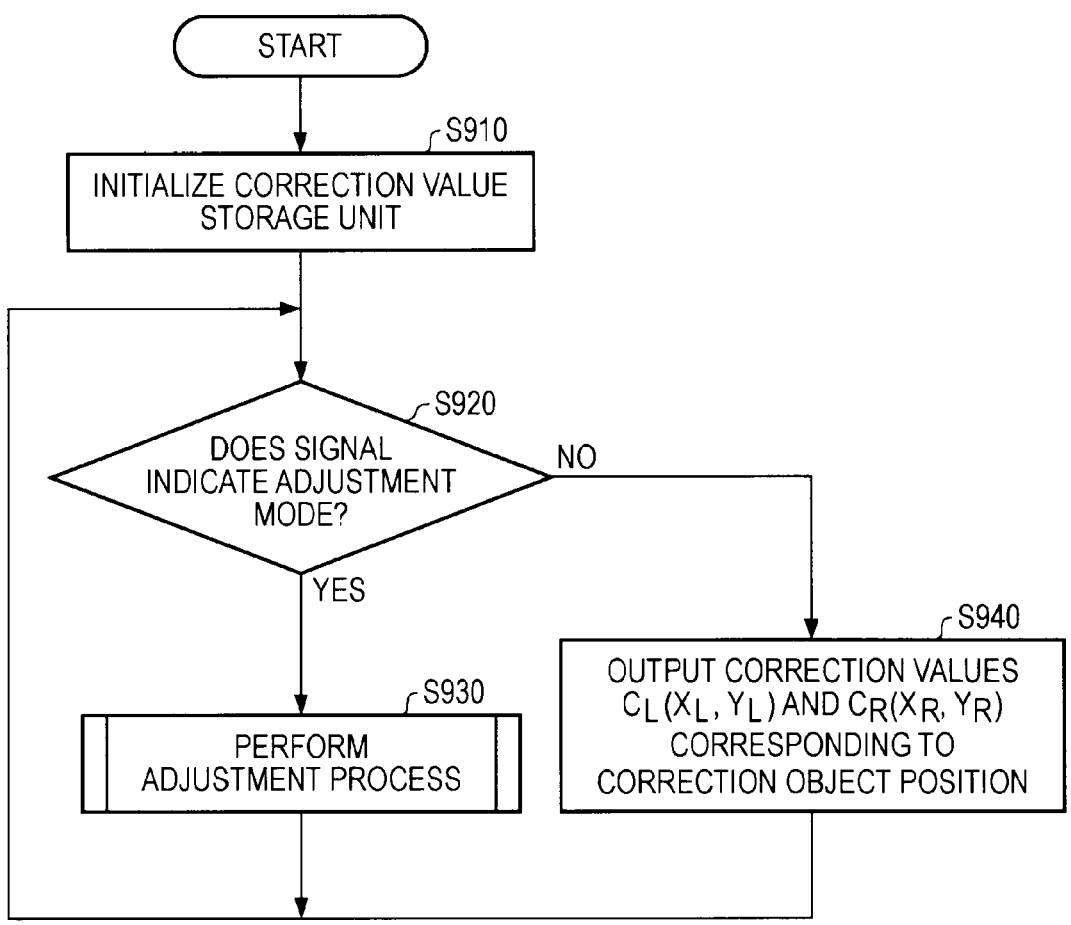
FIG. 14 is a block diagram illustrating an example of a configuration of a compound eye imaging apparatus according to the first embodiment of the present disclosure.

Next, operations of the correction value calculation apparatus 200 will be described with reference to FIGS. 14 and 15. FIG. 14 is a flowchart illustrating an example of the operations of the correction value calculation apparatus 200 according to the first embodiment of the present disclosure. The operations are performed, for example, when the compound eye imaging apparatus 100 is powered on, when the correction value is initialized, or the like.

The correction value calculation apparatus 200 initializes the correction value storage unit 254 (Step S910). The correction value calculation apparatus 200 determines based on the manipulation signal whether or not the manipulation signal is a signal indicating the adjustment mode (Step S920). In the case where the manipulation signal is a signal indicating the adjustment mode (Step S920:Yes), the correction value calculation apparatus 200 performs an adjustment process for calculating the correction value (Step S930). In the case where the manipulation signal is not a signal indicating the adjustment mode (Step S920:No), the correction value calculation apparatus 200 outputs the correction values $C_L$ and $C_R$ corresponding to the correction object positions according to the detection of the lens detection positions coincident with the correction object positions (Step S940). After Steps S930 and S940, the correction value calculation apparatus 200 returns to Step S920.

Figure 15:
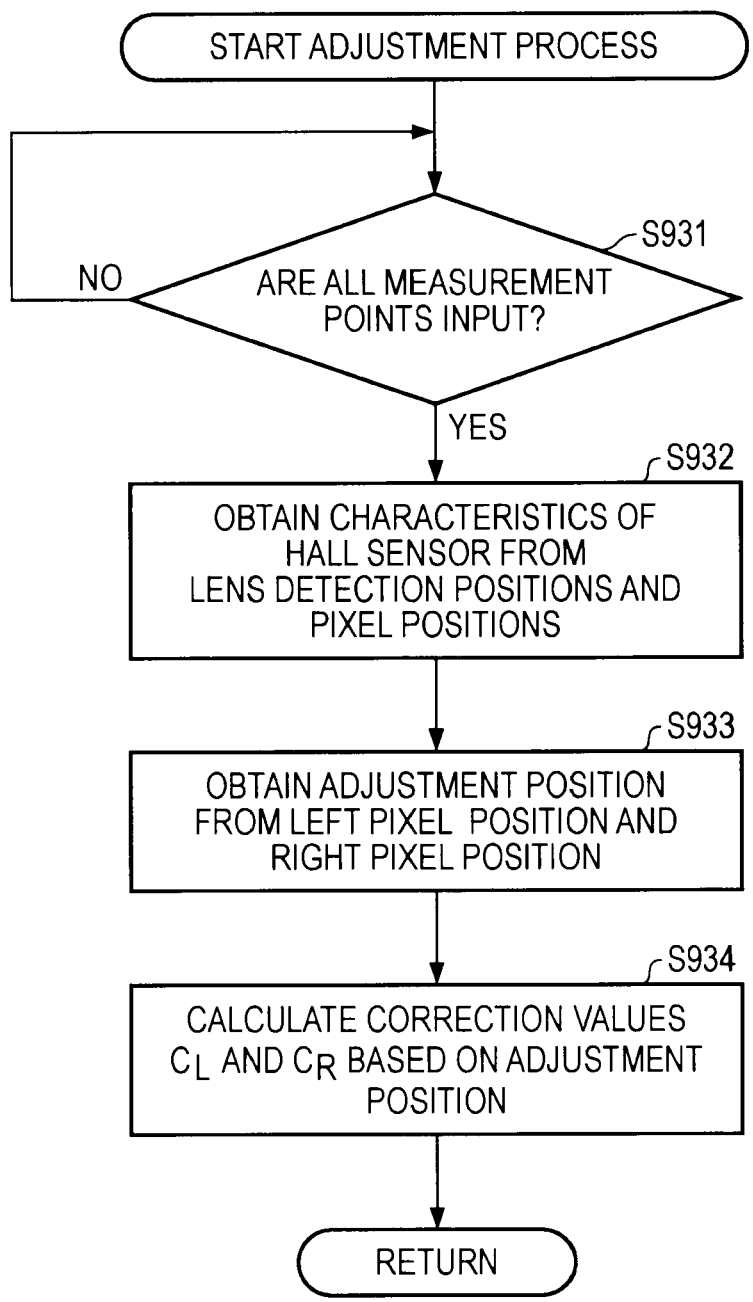
FIG. 15 is a flowchart illustrating an example of an adjustment process according to the first embodiment of the present disclosure.

FIG. 15 is a flowchart illustrating an example of the adjustment process according to the first embodiment of the present disclosure. The correction value calculation apparatus 200 determines whether or not all the measurement points including the lens detection positions and the pixel positions are input (Step S931). In the case where not all the measurement points are input (Step S931:No), the correction value calculation apparatus 200 returns to Step S931.

In the case where all the measurement points are input (Step S931:Yes), the correction value calculation apparatus 200 generates the characteristics of the respective Hall sensors from the lens detection positions and the pixel positions (Step S932). The correction value calculation apparatus 200 obtains the adjustment position from the left pixel position and the right pixel position according to each correction object position (Step S933). The correction value calculation apparatus 200 calculates the correction values $C_L$ and $C_R$ according to the correction object positions based on the adjustment position and stores the correction values $C_L$ and $C_R$ (Step S934). After Step S934, the correction value calculation apparatus 200 completes the adjustment process.

In this manner, the correction value calculation apparatus 200 generates the characteristic representing the relationship between the lens detection position and the pixel position and obtains the adjustment position from each of the pixel positions in the characteristic with respect to each correction object position. The correction value calculation apparatus 200 calculates the difference between the lens detection position and the correction object position corresponding to the adjustment position as the correction value with respect to each correction object position. The indication value is corrected based on the correction value, the position of the left shift lens 140 and the position of the right shift lens 170 are moved to the adjustment positions. Therefore, the deviation is reduced between the movement amount of the left image and the movement amount of the right image. As a result, although there is an error in the detection value of each of the Hall sensors, the compound eye imaging apparatus 100 may capture images from which stereoscopic viewing may be easily performed.

Figure 16:
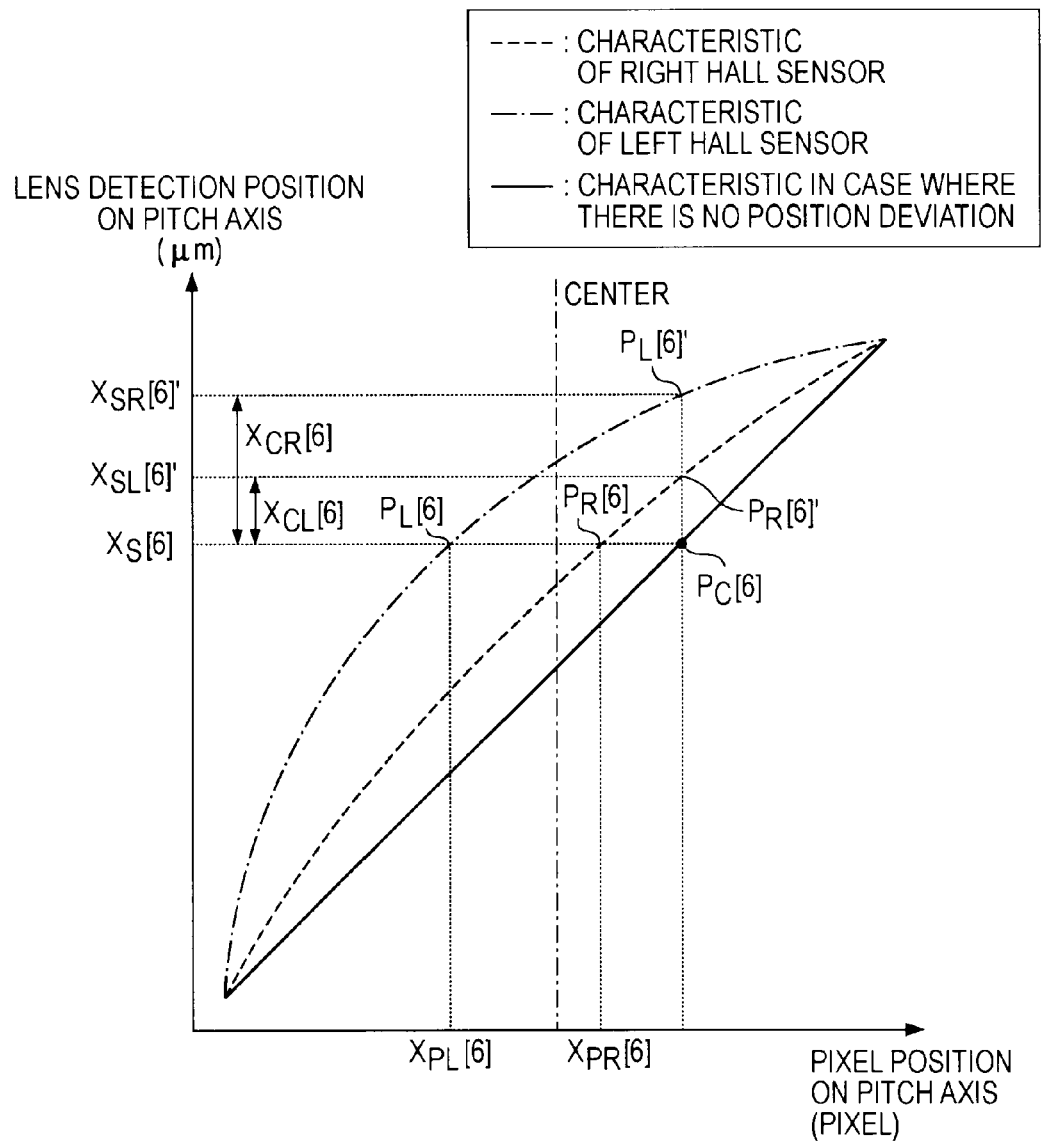
FIG. 16 is a graph illustrating characteristics of Hall sensors according to a modified example of the first embodiment of the present disclosure.

In addition, the correction value calculation apparatus 200 sets the intermediate point between the left pixel position and the right pixel position as the adjustment position. In the case where there is an error in any one of the Hall sensors, as illustrated in FIG. 16, if the position of an ideal characteristic where there is no error is set as the adjustment position, the outer appearance of the characteristic becomes approximately linear due to the correction, so that more accurate controlling may be performed. However, if any one of the errors is large, as illustrated in FIG. 16, if the position is set to the adjustment position, the correction value becomes large. If the correction value is large, a range used for the adjustment is increased within the movable range. If the range used for the adjustment is increased, the movable range for the hand blur correction is decreased by the increased range for the adjustment. The adjustment value is set as the intermediate point between the left pixel position and the right pixel position, so that the correction value may be set as a minimum value.

In addition, in the first embodiment of the present disclosure, the PID servo moves the left shift lens 140 and the right shift lens 170 through the PID controlling. However, if the target value and the lens detection value are compared and the positions of the shift lenses are controlled to be coincident with the target value, the compound eye imaging apparatus 100 may perform controlling other than the PID controlling.

In addition, in the compound eye imaging apparatus 100, although the Hall sensor is used as the position sensor, position sensors other than the Hall sensor may be used.

In addition, the compound eye imaging apparatus 100 generates the characteristics of the respective Hall sensors and calculates the correction values from the output voltage of the Hall sensor after the linearization. However, if the linearization is not necessary for the control of the shift lenses, the correction values may be calculated from the output voltage of the Hall sensor before the linearization.

In addition, the correction value calculation apparatus 200 calculates the correction values for correction of the positions on the pitch axis and the yaw axis. However, the correction value calculation apparatus 200 may calculate only the correction value on one of the pitch axis, the yaw axis, and the roll axis. In addition, if at least one of the pitch axis, the yaw axis, and the roll axis is included, the correction value calculation apparatus 200 may calculate the correction value of any combination thereof other than the combination of the pitch axis and the yaw axis.

In addition, although the correction value calculation apparatus 200 sets the intermediate point between the left pixel position and the right pixel position as the adjustment position, if a position other than the intermediate point is a position on a straight line connecting the left pixel position and the right pixel position, the position other than the intermediate point may be set as the adjustment position. For example, as illustrated in FIG. 16, the correction value calculation apparatus 200 may set an intersection point of the straight line connecting the left pixel position and the right pixel position and a straight line representing an ideal characteristic where there is no error as the adjustment position.

In addition, although the description is made of the case where the correction value calculation apparatus 200 performs the correction value calculation before the shipment from the factory, the correction value calculation apparatus 200 may perform the correction value calculation according to user's manipulation after the shipment from the factory to update the stored correction value. In this case, if a feature point is detected from a subject, the subject is not limited to a test chart. However, a natural object image where still object is captured is preferred as the image which is used as a feature point detection object, but an image where a moving object such as a person or a car is captured is not preferred. In the case of updating the correction value, the compound eye imaging apparatus 100 detects the feature point in the images corresponding to each indication value and detects a movement vector representing a movement direction and a movement amount of the feature point between the images. In the case where a plurality of the feature points are detected, the compound eye imaging apparatus 100 extracts dominant vectors which have the same movement direction which of the number is relatively large among the movement vectors. The compound eye imaging apparatus 100 calculates a statistic amount (average value and the like) of the movement amount of the extracted movement vectors and sets the statistic amount as the movement amount of the image. In this manner, since the dominant vectors are extracted, although some moving objects are partially included in the image, it is possible to prevent the movement amount of the image from be calculated based on the feature point of the moving object.

<2. Second Embodiment>
[Example of Configuration of Compound Eye Imaging Apparatus]

Figure 17:
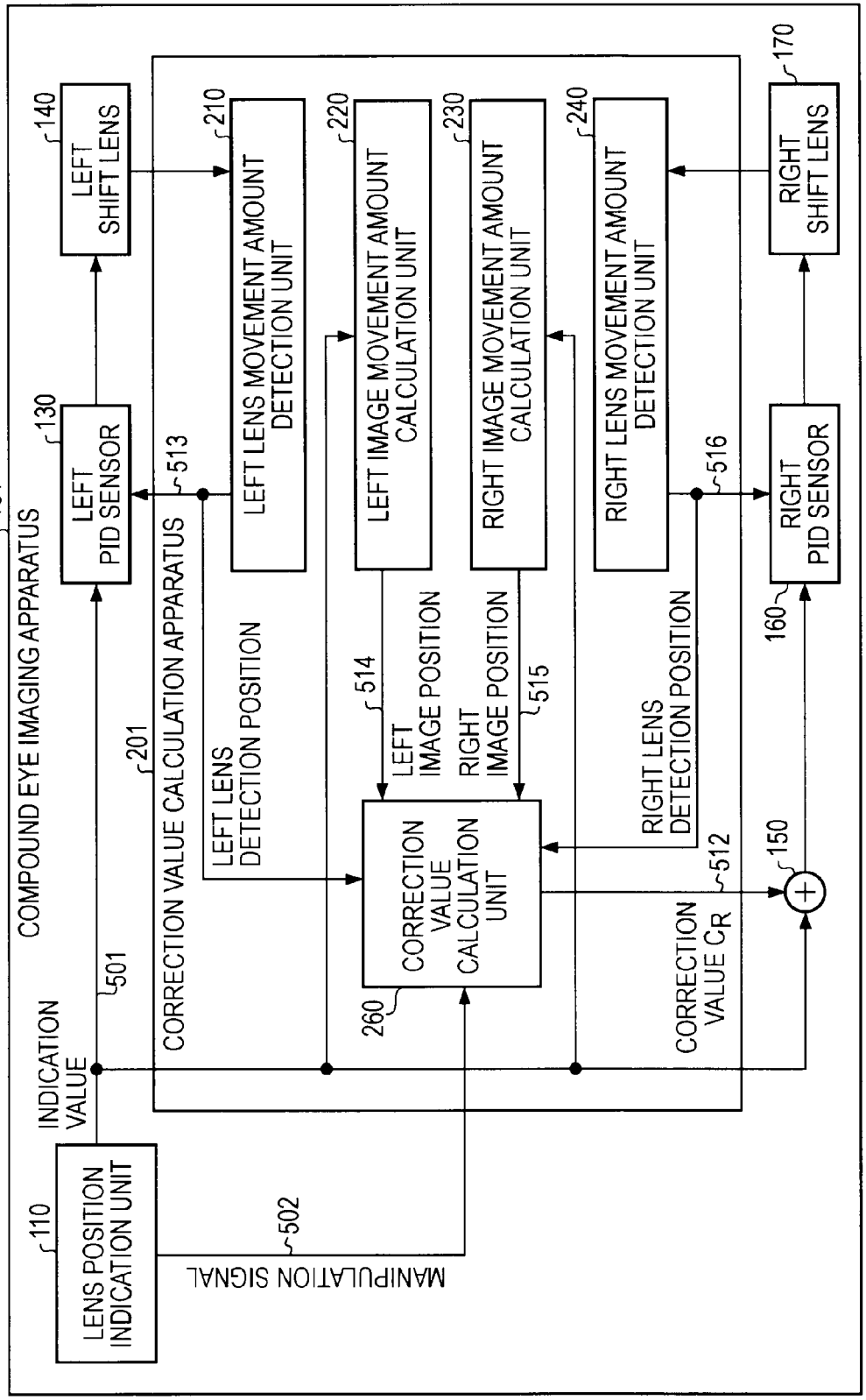
FIG. 17 is a block diagram illustrating an example of a configuration of a compound eye imaging apparatus according to a second embodiment of the present disclosure.

Next, a second embodiment of the present disclosure will be described with reference to FIGS. 17 to 19. FIG. 17 is a block diagram illustrating an example of a configuration of a compound eye imaging apparatus 101 according to the second embodiment of the present disclosure. The configuration of the compound eye imaging apparatus 101 is the same as that of the compound eye imaging apparatus 100 according to the first embodiment except that the adder 120 is not included and a correction value calculation apparatus 201 is included instead of the correction value calculation apparatus 200. The configuration of the correction value calculation apparatus 201 is the same as that of the correction value calculation apparatus 200 according to the first embodiment except that a correction value calculation unit 260 is included instead of the correction value calculation unit 250.

Figure 18:
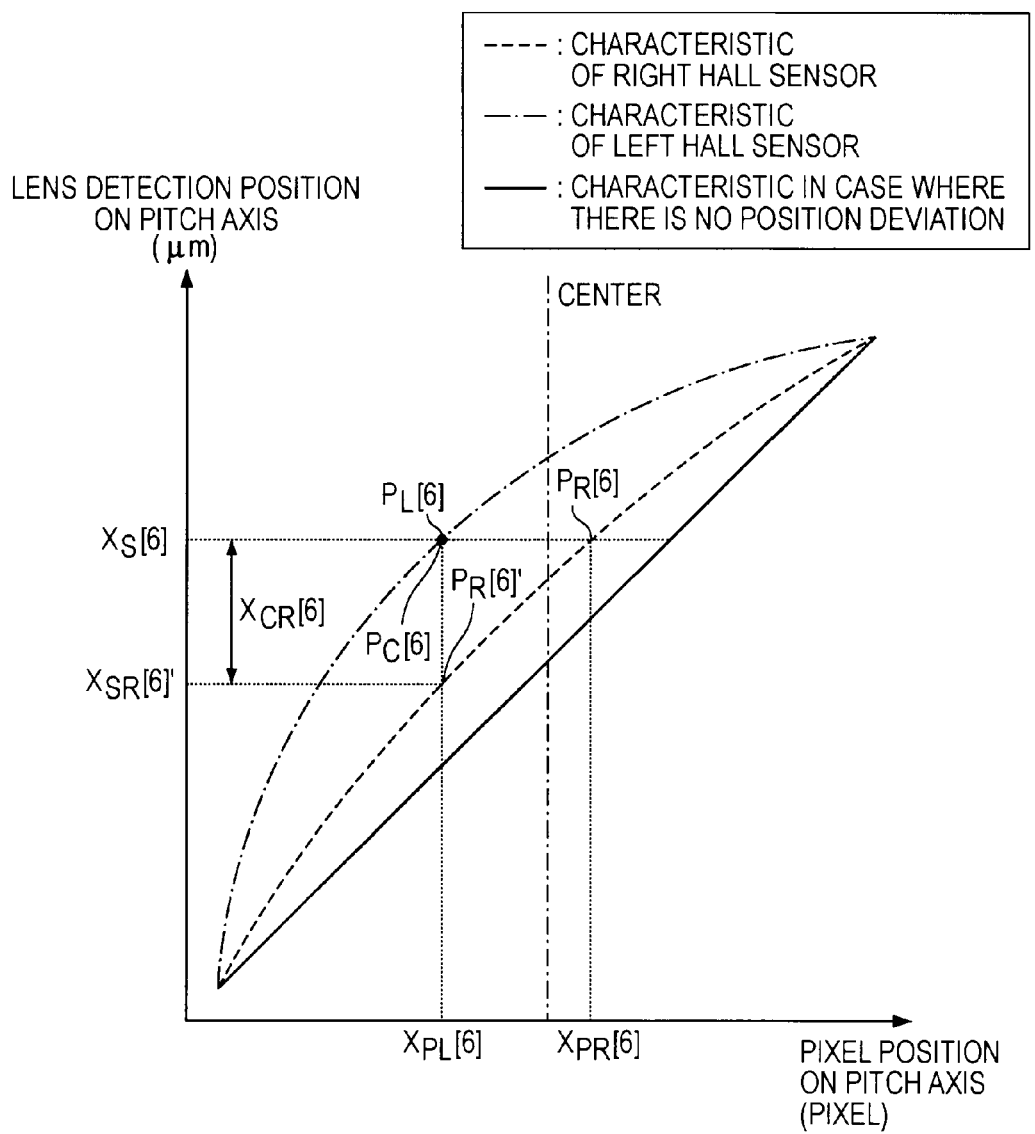
FIG. 18 is a graph illustrating characteristics of Hall sensors according to the second embodiment of the present disclosure.
Figure 19:
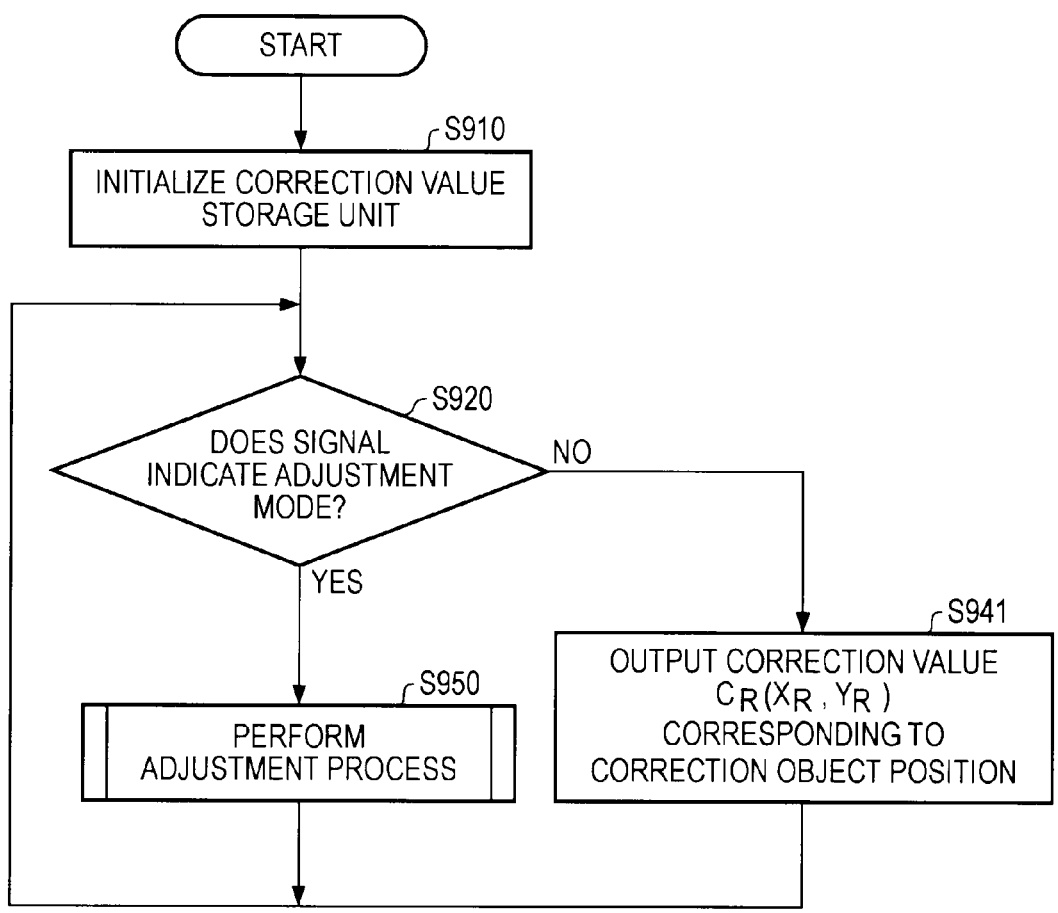
FIG. 19 is a flowchart illustrating an example of an adjustment process according to the second embodiment of the present disclosure.

As illustrated in FIG. 18, the correction value calculation unit 260 determines any one of the left pixel position and the right pixel position as an adjustment position. For example, the left pixel position is determined as the adjustment position. The correction value calculation unit 260 calculates the correction values $C_R$ corresponding to the correction object positions based on the adjustment position and stores the correction values $C_R$.

Although the setting of the left pixel position and the right pixel position may be determined as the adjustment position may be arbitrary, the determination may be made based on the frequency of use of the used shift lens. For example, in the case where a user selects one of a 2D mode where only one of the left image and the right image is captured and a 3D mode where both images are captured, a pixel position of an image used for the 2D mode may be determined as the adjustment position. As described above, by performing the adjustment where the correction value is added, the range where the shift lens is moved in the hand blur correction is reduced. Therefore, with respect to the shift lens of which the frequency of use is high, it is preferable that the adjustment is performed as little as possible. If the frequency of use is increased, the shift lens of which the frequency of use is low is adjusted in accordance with the shift lens in the assumed 2D mode, so that it is not necessary to adjust the shift lens of which the frequency of use is high.

[Operations of Correction Value Calculation Apparatus]

Next, operations of the correction value calculation apparatus 201 will be described with reference to FIG. 19. FIG. 19 is a flowchart illustrating an example of the operations of the correction value calculation apparatus 201 according to the second embodiment of the present disclosure. The operations are the same as the operations of the correction value calculation apparatus 200 according to the first embodiment except that Step S941 is performed instead of Step S940.

In the case where the manipulation signal is not a signal indicating the adjustment mode (Step S920:No), the correction value calculation apparatus 201 outputs the correction value $C_R$ corresponding to the correction object position according to the detection of the lens detection position coincident with the correction object position (Step S941).

In this manner, according to the second embodiment of the present disclosure, the left pixel position or the right pixel position is determined as the adjustment position, so that the number of correction values stored is reduced by half. Therefore, the storage capacity of the correction value storage unit 254 is reduced by half. In addition, the correction value calculation apparatus 200 may not necessarily perform the calculation of obtaining the intermediate point of the difference vector.

<3. Third Embodiment>
[Operations of Correction Value Calculation Apparatus]

Figure 20:
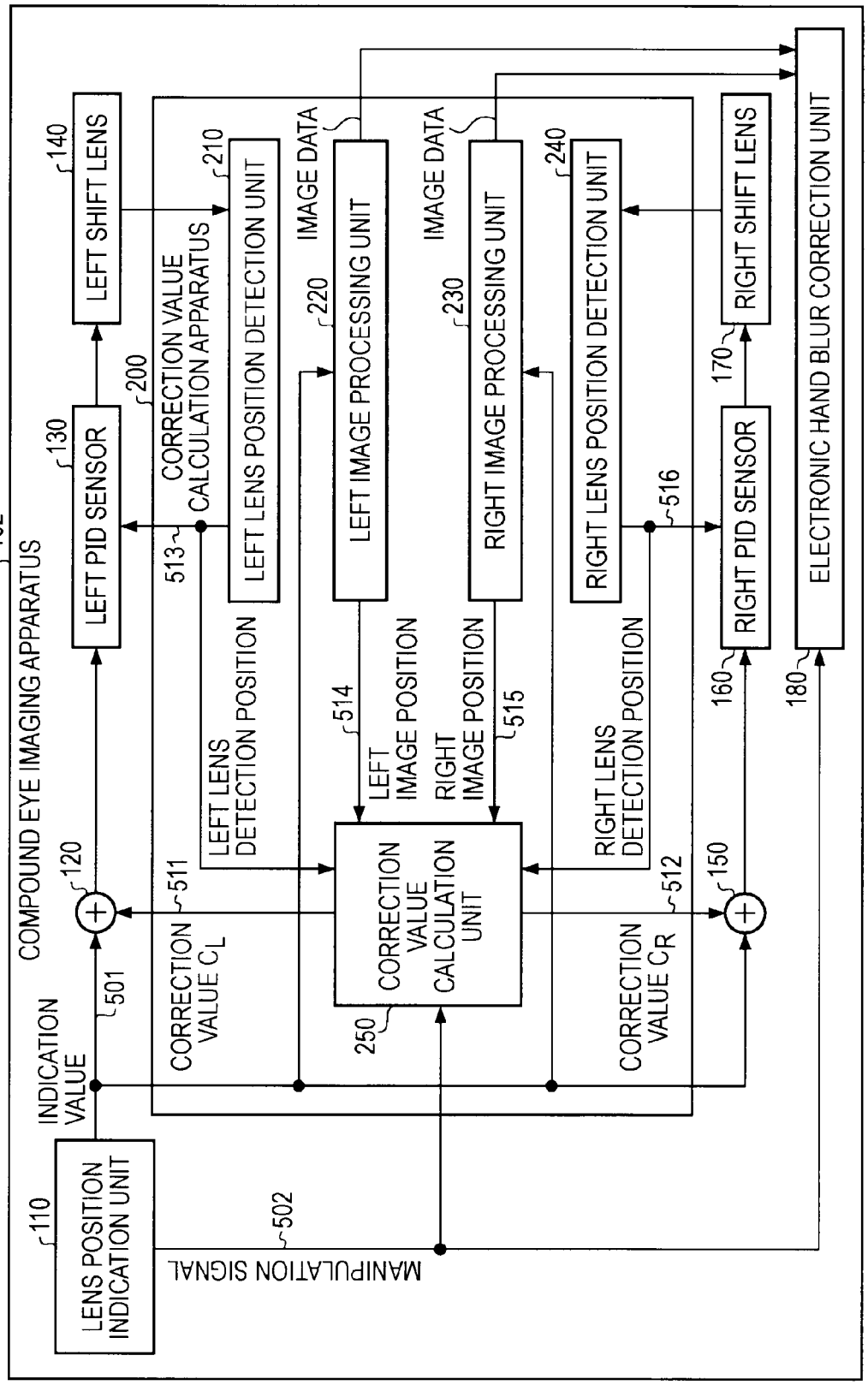
FIG. 20 is a block diagram illustrating an example of a configuration of a compound eye imaging apparatus according to a third embodiment of the present disclosure.

Next, a third embodiment of the present disclosure will be described with reference to FIG. 20. FIG. 20 is a block diagram illustrating an example of a configuration of a compound eye imaging apparatus 102 according to the third embodiment of the present disclosure. The configuration of the compound eye imaging apparatus 102 is the same as that of the compound eye imaging apparatus 100 of the first embodiment except that the compound eye imaging apparatus 102 further includes an electronic hand blur correction unit 180.

The electronic hand blur correction unit 180 performs an electronic hand blur correction. The electronic hand blur correction unit 180 receives image data representing a left image and a right image from a left image processing unit 220 and a right image processing unit 230 and receives a manipulation signal from a lens position indication unit 110. In the case where the manipulation signal is not a signal indicating an adjustment mode, the electronic hand blur correction unit 180 sets image-capturable areas in the first left image and the first right image and changes positions of the image-capturable areas in the second and latter left images and the second and latter right images so that a subject is included in the image-capturable areas.

In this manner, according to the third embodiment of the present disclosure, the electronic hand blur correction is further performed, so that the hand blur correction is more appropriately performed. The electronic hand blur correction according to the third embodiment may also be applied to the second embodiment.

In addition, the embodiments of the present disclosure are examples for embodying the present disclosure, and as clarified in the embodiments of the present disclosure, matters in the embodiments of the present disclosure have a corresponding relationship with specific matters in the embodiment of the present disclosure. Similarly, specific matters in the embodiment of the present disclosure and matters in the embodiments of the present disclosure denoted by the same names have a corresponding relationship with each other. However, the present disclosure is not limited to the embodiments, and various modifications of the embodiments may be embodied in the scope of the present disclosure without departing from the spirit of the present disclosure.

In addition, the process procedures described in the embodiments of the present disclosure may be regarded as a method having a series of procedures, or regarded as a program for allowing a computer to execute a series of procedures or a recording medium which stores the program. As the recording medium, for example, a CD (Compact Disc), an MD (Mini Disc), a DVD (Digital Versatile Disc), a memory card, a Blu-ray Disc (registered trademark), or the like may be used.

The present disclosure contains subject matter related to that disclosed in Japanese Priority Patent Application JP 2010-282852 filed in the Japan Patent Office on Dec. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A correction value calculation apparatus comprising:
circuitry configured to:
acquire a relative position of a first feature point to a first reference point in a left image formed by a left lens as a left pixel position with respect to indication values in the case where the left lens is moved in a coordinate system constructed with a pitch axis and a yaw axis according to each of a plurality of the indication values indicating a plurality of positions in the coordinate system;
acquire a relative position of a second feature point to a second reference point in a right image formed by a right lens as a right pixel position with respect to the indication values in the case where the right lens is moved in the coordinate system according to each of the plurality of the indication values;
detect a relative position in the coordinate system of the left lens to a first reference position as a left lens detection position in the coordinate system in the case where the left lens is moved in the coordinate system according to each of the plurality of the indication values;
detect a relative position in the coordinate system of the right lens to a second reference position as a right lens detection position in the coordinate system in the case where the right lens is moved in the coordinate system according to each of the plurality of the indication values;
generate a characteristic representing a relationship between corresponding ones of the left pixel position and the left lens detection position in the coordinate system, and generate a characteristic representing a relationship between corresponding ones of the right pixel position and the right lens detection position in the coordinate system;
set each of the left lens detection positions and the right lens detection positions in the generated characteristic as respective correction object positions in the coordinate system, and determine an adjustment position which is a position on a straight line connecting the left pixel position and the right pixel position corresponding to the correction object position with respect to each of the plurality of said correction object positions in the coordinate system; and
calculate correction values to be added to the indication values to adjust the pitch axis and the yaw axis of both of the left lens and the right lens in the coordinate system, the correction values being differences between the left lens detection position and the right lens detection position corresponding to the adjustment position and the correction object position in the corresponding generated characteristic, with respect to each of the plurality of said correction object positions in the coordinate system.

2. The correction value calculation apparatus according to claim 1, wherein the circuitry sets an intermediate point between the left pixel position and the right pixel position as the adjustment position.

3. The correction value calculation apparatus according to claim 1, wherein the circuitry sets the left pixel position or the right pixel position as the adjustment position.

4. The correction value calculation apparatus according to claim 1, wherein the circuitry sets an intersection point of a predetermined straight line and a straight line connecting the left pixel position and the right pixel position as the adjustment position.

5. The correction value calculation apparatus according to claim 1,
wherein the circuitry stores the calculated correction values with respect to the correction object positions; and
wherein the circuitry is input with a manipulation signal indicating outputting of the correction value, and reads and outputs the correction value corresponding to the correction object position in the case where the left lens detection position or the right lens detection position coincident with any one of the correction object positions is detected.

6. The correction value calculation apparatus according to claim 1, wherein the plurality of the indication values to move the left lens and the right lens are to perform hand blur correction.

7. The correction value calculation apparatus according to claim 1, wherein the correction values are to correct a difference between errors in detection of positions in the coordinate system of the left lens and the right lens.

8. A compound eye imaging apparatus comprising:
a left lens;
a right lens;
a left lens driving unit which moves the left lens in a coordinate system constructed with a pitch axis and a yaw axis according to a plurality of indication values indicating a plurality of positions in the coordinate system;

a right lens driving unit which moves the right lens in the coordinate system according to the plurality of the indication values; and circuitry configured to:

acquire a relative position of a first feature point to a first reference point in a left image formed by the left lens as a left pixel position with respect to indication values in the case where the left lens is moved in the coordinate system according to each of the plurality of the indication values;

acquire a relative position of a second feature point to a second reference point in a right image formed by the right lens as a right pixel position with respect to the indication values in the case where the right lens is moved in the coordinate system according to each of the plurality of the indication values;

detect a relative position in the coordinate system of the left lens to a first reference position as a left lens detection position in the coordinate system in the case where the left lens is moved in the coordinate system according to each of the plurality of the indication values;

detect a relative position in the coordinate system of the right lens to a second reference position as a right lens detection position in the coordinate system in the case where the right lens is moved in the coordinate system according to each of the plurality of the indication values;

generate a characteristic representing a relationship between corresponding ones of the left pixel position and the left lens detection position in the coordinate system, and generate a characteristic representing a relationship between corresponding ones of the right pixel position and the right lens detection position in the coordinate system;

set each of the left lens detection positions and the right lens detection positions in the corresponding generated characteristic as respective correction object positions in the coordinate system, and calculate an adjustment position which is a position on a straight line connecting the left pixel position and the right pixel position corresponding to the correction object position with respect to each of the plurality of said correction object positions in the coordinate system;

determine correction values to be added to the indication values to adjust the pitch axis and the yaw axis of both of the left lens and the right lens in the coordinate system, the correction values being differences between the left lens detection position and the right lens detection position corresponding to the adjustment position and the correction object position in the corresponding generated characteristic, with respect to each of the plurality of said correction object positions in the coordinate system;

store the calculated correction values with respect to the correction object positions;

be input with a manipulation signal indicating outputting of the correction value and read and output the correction value corresponding to the correction object position in the case where the left lens detection position or the right lens detection position in the coordinate system coincident with any one of the correction object positions is detected; and add the calculated correction value to the indication value and output the indication value added with the correction value to the left lens driving unit or the right lens driving unit.

9. The compound eye imaging apparatus according to claim 8, wherein the plurality of the indication values to move the left lens and the right lens are to perform hand blur correction.

10. The compound eye imaging apparatus according to claim 8, wherein the correction values are to correct a difference between errors in detection of positions in the coordinate system of the left lens and the right lens.

11. A method of controlling a correction value calculation apparatus, comprising:

acquiring a relative position of a first feature point to a first reference point in a left image formed by a left lens as a left pixel position with respect to indication values in the case where the left lens is moved in a coordinate system constructed with a pitch axis and a yaw axis according to each of a plurality of the indication values indicating a plurality of positions in the coordinate system;

acquiring a relative position of a second feature point to a second reference point in a right image formed by the right lens as a right pixel position with respect to the indication values in the case where the right lens is moved in the coordinate system according to each of the plurality of the indication values;

detecting a relative position in the coordinate system of the left lens to a first reference position as a left lens detection position in the coordinate system in the case where the left lens is moved according to each of the plurality of the indication values;

detecting a relative position in the coordinate system of the right lens to a second reference position as a right lens detection position in the case where the right lens is moved in the coordinate system according to each of the plurality of the indication values;

generating, using circuitry, a characteristic representing a relationship between corresponding ones of the left pixel position and the left lens detection position in the coordinate system, and generating, using the circuitry, a characteristic representing a relationship between corresponding ones of the right pixel position and the right lens detection position in the coordinate system;

setting, using the circuitry, each of the left lens detection positions and the right lens detection positions in the corresponding generated characteristic as correction object positions in the coordinate system, and calculating an adjustment position which is a position on a straight line connecting the left pixel position and the right pixel position corresponding to the correction object position with respect to each of the plurality of said correction object positions in the coordinate system; and calculating, using the circuitry, correction values to be added to the indication values to adjust the pitch axis and the yaw axis of both of the left lens and the right lens in the coordinate system, the correction values being differences between the left lens detection position and the right lens detection position corresponding to the adjustment position and the correction object position in the corresponding generated characteristic, with respect to each of the plurality of said correction object positions in the coordinate system.

12. The method of the correction value calculation apparatus according to claim 11, wherein the plurality of the indication values to move the left lens and the right lens are to perform hand blur correction.

13. The method of the correction value calculation apparatus according to claim 11, wherein the correction values are to correct a difference between errors in detection of positions in the coordinate system of the left lens and the right lens.

* * * * *